United States Patent
Miller et al.

(10) Patent No.: US 7,914,029 B2
(45) Date of Patent: Mar. 29, 2011

(54) CONTINUOUSLY VARIABLE TRANSMISSION

(75) Inventors: Donald C Miller, Fallbrook, CA (US); Robert A Smithson, Cedar Park, TX (US); Brad P Pohl, Leander, TX (US); Charles B Lohr, Austin, TX (US); Jon M Nichols, Georgetown, TX (US)

(73) Assignee: Fallbrook Technologies Inc., San Diego, CA (US)

( * ) Notice: Subject to any disclaimer, the term of this patent is extended or adjusted under 35 U.S.C. 154(b) by 0 days.

(21) Appl. No.: 12/039,591

(22) Filed: Feb. 28, 2008

(65) Prior Publication Data

US 2008/0141810 A1     Jun. 19, 2008

Related U.S. Application Data

(63) Continuation of application No. 11/562,317, filed on Nov. 21, 2006, now abandoned.

(60) Provisional application No. 60/738,865, filed on Nov. 22, 2005.

(51) Int. Cl.
*B62M 1/02* (2006.01)

(52) U.S. Cl. .......... 280/261; 475/189; 475/196; 476/36

(58) Field of Classification Search .................. 475/189, 475/196, 37; 476/36–38; 280/261
See application file for complete search history.

(56) References Cited

U.S. PATENT DOCUMENTS

| | | |
|---|---|---|
| 719,595 A | 2/1903 | Huss |
| 1,097,546 A * | 5/1914 | Harley ....................... 192/217.1 |
| 1,121,210 A | 12/1914 | Techel |
| 1,175,677 A | 3/1916 | Barnes |
| 1,380,006 A | 5/1921 | Nielson |
| 1,390,971 A | 9/1921 | Samain |
| 1,629,902 A | 5/1927 | Arter et al. |
| 1,686,446 A | 10/1928 | Gilman |

(Continued)

FOREIGN PATENT DOCUMENTS

CH    118064    12/1926

(Continued)

OTHER PUBLICATIONS

International Search Report for International Application No. PCT/US2006/044983 dated Jun. 13, 2008.

(Continued)

*Primary Examiner* — Lesley Morris
*Assistant Examiner* — Maurice Williams
(74) *Attorney, Agent, or Firm* — Knobbe, Martens, Olson & Bear LLP

(57) ABSTRACT

Traction planets and traction rings can be operationally coupled to a planetary gearset to provide a continuously variable transmission (CVT). The CVT can be used in a bicycle. In one embodiment, the CVT is mounted on the frame of the bicycle at a location forward of the rear wheel hub of the bicycle. In one embodiment, the CVT is mounted on and supported by members of the bicycle frame such that the CVT is coaxial with the crankshaft of the bicycle. The crankshaft is configured to drive elements of the planetary gearset, which are configured to operationally drive the traction rings and the traction planets. Inventive component and subassemblies for such a CVT are disclosed. A shifting mechanism includes a plurality of pivot arms arranged to pivot about the centers of the traction planets as a shift pin hub moves axially.

13 Claims, 20 Drawing Sheets

U.S. PATENT DOCUMENTS

| | | |
|---|---|---|
| 1,793,571 A | 2/1931 | Vaughn |
| 1,847,027 A | 2/1932 | Thomsen et al. |
| 1,858,696 A | 5/1932 | Weiss |
| 1,865,102 A | 6/1932 | Hayes |
| 1,903,228 A | 3/1933 | Thomson |
| 2,060,884 A | 11/1936 | Madle |
| 2,086,491 A | 7/1937 | Dodge |
| 2,109,845 A | 3/1938 | Madle |
| 2,112,763 A | 3/1938 | Cloudsley |
| 2,152,796 A | 4/1939 | Erban |
| 2,209,254 A | 7/1940 | Ahnger |
| 2,259,933 A | 10/1941 | Holloway |
| 2,325,502 A | 7/1943 | Felix |
| 2,469,653 A | 5/1949 | Kopp |
| 2,480,968 A | 9/1949 | Ronai |
| 2,596,538 A | 5/1952 | Dicke |
| 2,597,849 A | 9/1952 | Alfredeen |
| 2,675,713 A | 4/1954 | Acker |
| 2,730,904 A | 1/1956 | Rennerfelt |
| 2,748,614 A | 6/1956 | Weisel |
| 2,868,038 A | 1/1959 | Billeter |
| 2,883,883 A | 4/1959 | Chillson |
| 2,913,932 A | 11/1959 | Oehru |
| 2,931,234 A | 4/1960 | Hayward |
| 2,931,235 A | 4/1960 | Hayward |
| 2,949,800 A | 8/1960 | Neuschotz |
| 2,959,063 A | 11/1960 | Perry |
| 2,959,972 A | 11/1960 | Madson |
| 3,087,348 A | 4/1963 | Kraus |
| 3,163,050 A | 12/1964 | Kraus |
| 3,184,983 A | 5/1965 | Kraus |
| 3,216,283 A | 11/1965 | General |
| 3,248,960 A | 5/1966 | Schottler |
| 3,273,468 A | 9/1966 | Allen |
| 3,280,646 A | 10/1966 | Lemieux |
| 3,292,443 A | 12/1966 | Felix |
| 3,464,281 A | 9/1969 | Azuma et al. |
| 3,487,726 A | 1/1970 | Burnett |
| 3,487,727 A | 1/1970 | Gustafsson |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,768,715 A | 10/1973 | Tout |
| 3,769,849 A | 11/1973 | Hagen |
| 3,800,607 A | 4/1974 | Zurcher |
| 3,820,416 A | 6/1974 | Kraus |
| 3,891,235 A | 6/1975 | Shelly |
| 3,934,492 A | 1/1976 | Timbs |
| 3,934,493 A | 1/1976 | Hillyer |
| 3,954,282 A | 5/1976 | Hege |
| 3,984,129 A | 10/1976 | Hege |
| 3,996,807 A | 12/1976 | Adams |
| 4,103,514 A | 8/1978 | Grosse-Entrup |
| 4,158,317 A | 6/1979 | James |
| 4,169,609 A | 10/1979 | Zampedro |
| 4,177,683 A | 12/1979 | Moses |
| 4,227,712 A | 10/1980 | Dick |
| 4,345,486 A | 8/1982 | Olesen |
| 4,369,667 A | 1/1983 | Kemper |
| 4,391,156 A | 7/1983 | Tibbals |
| 4,459,873 A | 7/1984 | Black |
| 4,464,952 A | 8/1984 | Stubbs |
| 4,494,524 A | 1/1985 | Wagner |
| 4,496,051 A | 1/1985 | Ortner |
| 4,574,649 A | 3/1986 | Seol |
| 4,585,429 A | 4/1986 | Marier |
| 4,628,766 A | 12/1986 | De Brie Perry |
| 4,630,839 A | 12/1986 | Seol |
| 4,700,581 A | 10/1987 | Tibbals, Jr. |
| 4,735,430 A | 4/1988 | Tomkinson |
| 4,744,261 A | 5/1988 | Jacobson |
| 4,756,211 A | 7/1988 | Fellows |
| 4,781,663 A | 11/1988 | Reswick |
| 4,838,122 A | 6/1989 | Takamiya et al. |
| 4,856,374 A | 8/1989 | Kreuzer |
| 4,857,035 A | 8/1989 | Anderson |
| 4,869,130 A | 9/1989 | Wiecko |
| 4,900,046 A | 2/1990 | Aranceta-Angoitia |
| 4,909,101 A | 3/1990 | Terry |
| 4,961,477 A | 10/1990 | Sweeney |
| 5,020,384 A | 6/1991 | Kraus |
| 5,037,361 A | 8/1991 | Takahashi |
| 5,051,106 A | 9/1991 | Fritsch |
| 5,069,655 A | 12/1991 | Schivelbusch |
| 5,121,654 A | 6/1992 | Fasce |
| 5,125,677 A | 6/1992 | Ogilvie et al. |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schievelbusch |
| 5,273,501 A * | 12/1993 | Schievelbusch .............. 476/40 |
| 5,318,486 A | 6/1994 | Lutz |
| 5,330,396 A | 7/1994 | Lohr et al. |
| 5,355,749 A | 10/1994 | Obara et al. |
| 5,375,865 A | 12/1994 | Terry, Sr. |
| 5,379,661 A | 1/1995 | Nakano |
| 5,383,677 A | 1/1995 | Thomas |
| 5,387,000 A | 2/1995 | Sato |
| 5,451,070 A | 9/1995 | Lindsay et al. |
| 5,508,574 A | 4/1996 | Vlock |
| 5,601,301 A | 2/1997 | Liu |
| 5,607,373 A | 3/1997 | Ochiai et al. |
| 5,632,702 A * | 5/1997 | Mills ........................... 475/170 |
| 5,645,507 A | 7/1997 | Hathaway |
| 5,651,750 A | 7/1997 | Imanishi et al. |
| 5,690,346 A | 11/1997 | Keskitalo |
| 5,746,676 A | 5/1998 | Kawase et al. |
| 5,799,541 A | 9/1998 | Arbeiter |
| 5,823,052 A | 10/1998 | Nobumoto |
| 5,846,155 A | 12/1998 | Taniguchi et al. |
| 5,899,827 A | 5/1999 | Nakano et al. |
| 5,967,933 A | 10/1999 | Valdenaire |
| 5,967,938 A * | 10/1999 | Benford et al. .............. 475/297 |
| 5,984,826 A | 11/1999 | Nakano |
| 6,000,707 A | 12/1999 | Miller |
| 6,006,151 A | 12/1999 | Graf |
| 6,029,990 A | 2/2000 | Busby |
| 6,042,132 A | 3/2000 | Suenaga et al. |
| 6,045,481 A | 4/2000 | Kumagai |
| 6,053,833 A | 4/2000 | Masaki |
| 6,053,841 A | 4/2000 | Kolde et al. |
| 6,055,878 A * | 5/2000 | Mills et al. ..................... 74/117 |
| 6,066,067 A | 5/2000 | Greenwood |
| 6,071,210 A | 6/2000 | Kato |
| 6,079,726 A | 6/2000 | Busby |
| 6,095,940 A | 8/2000 | Ai et al. |
| 6,113,513 A | 9/2000 | Itoh et al. |
| 6,119,539 A | 9/2000 | Papanicolaou |
| 6,119,800 A | 9/2000 | McComber |
| 6,159,126 A | 12/2000 | Oshidan |
| 6,186,922 B1 | 2/2001 | Bursal et al. |
| 6,241,636 B1 | 6/2001 | Miller |
| 6,243,638 B1 | 6/2001 | Abo et al. |
| 6,322,475 B2 | 11/2001 | Miller |
| 6,325,386 B1 | 12/2001 | Shoge |
| 6,340,067 B1 | 1/2002 | Fujiwara |
| 6,375,412 B1 | 4/2002 | Dial |
| 6,390,946 B1 | 5/2002 | Hibi et al. |
| 6,406,399 B1 | 6/2002 | Ai |
| 6,419,608 B1 | 7/2002 | Miller |
| 6,461,268 B1 | 10/2002 | Milner |
| 6,499,373 B2 | 12/2002 | Van Cor |
| 6,532,890 B2 | 3/2003 | Chen |
| 6,551,210 B2 | 4/2003 | Miller |
| 6,575,047 B2 | 6/2003 | Reik et al. |
| 6,672,418 B1 | 1/2004 | Makino |
| 6,676,559 B2 | 1/2004 | Miller |
| 6,679,109 B2 | 1/2004 | Gierling et al. |
| 6,689,012 B2 | 2/2004 | Miller |
| 6,805,654 B2 | 10/2004 | Nishii |
| 6,931,316 B2 | 8/2005 | Joe et al. |
| 6,945,903 B2 | 9/2005 | Miller |
| 6,949,049 B2 | 9/2005 | Miller |
| 6,991,579 B2 | 1/2006 | Kobayashi et al. |

| | | |
|---|---|---|
| 7,011,600 B2 | 3/2006 | Miller et al. |
| 7,011,601 B2 | 3/2006 | Miller |
| 7,014,591 B2 | 3/2006 | Miller |
| 7,029,418 B2 | 4/2006 | Taketsuna et al. |
| 7,032,914 B2 | 4/2006 | Miller |
| 7,036,620 B2 | 5/2006 | Miller et al. |
| 7,044,884 B2 | 5/2006 | Miller |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,086,979 B2 | 8/2006 | Frenken |
| 7,086,981 B2 * | 8/2006 | Ali et al. ................ 475/210 |
| 7,112,158 B2 | 9/2006 | Miller |
| 7,112,159 B2 | 9/2006 | Miller et al. |
| 7,125,297 B2 | 10/2006 | Miller et al. |
| 7,131,930 B2 | 11/2006 | Miller et al. |
| 7,140,999 B2 | 11/2006 | Miller |
| 7,147,586 B2 | 12/2006 | Miller et al. |
| 7,153,233 B2 | 12/2006 | Miller et al. |
| 7,156,770 B2 | 1/2007 | Miller |
| 7,160,222 B2 | 1/2007 | Miller |
| 7,163,485 B2 | 1/2007 | Miller |
| 7,163,486 B2 | 1/2007 | Miller et al. |
| 7,166,052 B2 | 1/2007 | Miller et al. |
| 7,166,056 B2 | 1/2007 | Miller et al. |
| 7,166,057 B2 | 1/2007 | Miller et al. |
| 7,166,058 B2 | 1/2007 | Miller et al. |
| 7,169,076 B2 | 1/2007 | Miller et al. |
| 7,172,529 B2 | 2/2007 | Miller et al. |
| 7,175,564 B2 | 2/2007 | Miller |
| 7,175,565 B2 | 2/2007 | Miller et al. |
| 7,175,566 B2 | 2/2007 | Miller et al. |
| 7,192,381 B2 | 3/2007 | Miller et al. |
| 7,197,915 B2 | 4/2007 | Luh et al. |
| 7,198,582 B2 | 4/2007 | Miller et al. |
| 7,198,583 B2 | 4/2007 | Miller et al. |
| 7,198,584 B2 | 4/2007 | Miller et al. |
| 7,198,585 B2 | 4/2007 | Miller et al. |
| 7,201,693 B2 | 4/2007 | Miller et al. |
| 7,201,694 B2 | 4/2007 | Miller et al. |
| 7,201,695 B2 | 4/2007 | Miller et al. |
| 7,204,777 B2 | 4/2007 | Miller et al. |
| 7,214,159 B2 | 5/2007 | Miller et al. |
| 7,217,215 B2 | 5/2007 | Miller et al. |
| 7,217,219 B2 | 5/2007 | Miller |
| 7,217,220 B2 | 5/2007 | Careau et al. |
| 7,232,395 B2 | 6/2007 | Miller et al. |
| 7,235,031 B2 | 6/2007 | Miller et al. |
| 7,238,136 B2 | 7/2007 | Miller et al. |
| 7,238,137 B2 | 7/2007 | Miller et al. |
| 7,238,138 B2 | 7/2007 | Miller et al. |
| 7,246,672 B2 | 7/2007 | Shirai et al. |
| 7,250,018 B2 | 7/2007 | Miller et al. |
| 7,261,663 B2 | 8/2007 | Miller et al. |
| 7,275,610 B2 | 10/2007 | Kuang et al. |
| 7,288,042 B2 | 10/2007 | Miller et al. |
| 7,320,660 B2 | 1/2008 | Miller |
| 7,322,901 B2 | 1/2008 | Miller et al. |
| 2001/0008192 A1 | 7/2001 | Morisawa |
| 2002/0153695 A1 | 10/2002 | Wang |
| 2003/0022753 A1 | 1/2003 | Mizuno et al. |
| 2003/0221892 A1 | 12/2003 | Matsumoto et al. |
| 2004/0119345 A1 | 6/2004 | Takano |
| 2004/0204283 A1 | 10/2004 | Inoue |
| 2005/0178893 A1 | 8/2005 | Miller et al. |
| 2005/0227809 A1 | 10/2005 | Bitzer et al. |
| 2006/0084549 A1 | 4/2006 | Smithson et al. |
| 2006/0108956 A1 | 5/2006 | Clark |
| 2006/0180363 A1 | 8/2006 | Uchisasai |
| 2007/0041823 A1 | 2/2007 | Miller |
| 2007/0049450 A1 | 3/2007 | Miller |
| 2007/0142161 A1 | 6/2007 | Miller |
| 2007/0155567 A1 | 7/2007 | Miller et al. |
| 2007/0155580 A1 | 7/2007 | Nichols et al. |
| 2007/0167275 A1 | 7/2007 | Miller |
| 2007/0167277 A1 | 7/2007 | Miller |
| 2007/0167278 A1 | 7/2007 | Miller |
| 2007/0167279 A1 | 7/2007 | Miller |
| 2007/0167280 A1 | 7/2007 | Miller |
| 2007/0179013 A1 | 8/2007 | Miller et al. |
| 2007/0197337 A1 | 8/2007 | Miller et al. |
| 2007/0270265 A1 | 11/2007 | Miller et al. |
| 2007/0270266 A1 | 11/2007 | Miller et al. |
| 2007/0270267 A1 | 11/2007 | Miller et al. |
| 2007/0270268 A1 | 11/2007 | Miller et al. |
| 2007/0270269 A1 | 11/2007 | Miller et al. |
| 2007/0270270 A1 | 11/2007 | Miller et al. |
| 2007/0270271 A1 | 11/2007 | Miller et al. |
| 2007/0270272 A1 | 11/2007 | Miller et al. |
| 2007/0270278 A1 | 11/2007 | Miller et al. |
| 2007/0275809 A1 | 11/2007 | Miller et al. |
| 2007/0281819 A1 | 12/2007 | Miller et al. |
| 2007/0287577 A1 | 12/2007 | Miller |
| 2007/0287578 A1 | 12/2007 | Miller |
| 2007/0287579 A1 | 12/2007 | Miller et al. |
| 2007/0287580 A1 | 12/2007 | Miller |
| 2008/0032852 A1 | 2/2008 | Smithson et al. |
| 2008/0032853 A1 | 2/2008 | Smithson et al. |
| 2008/0032854 A1 | 2/2008 | Smithson et al. |
| 2008/0034585 A1 | 2/2008 | Smithson et al. |
| 2008/0034586 A1 | 2/2008 | Smithson et al. |
| 2008/0039269 A1 | 2/2008 | Smithson et al. |
| 2008/0039270 A1 | 2/2008 | Smithson et al. |
| 2008/0039271 A1 | 2/2008 | Smithson et al. |
| 2008/0039272 A1 | 2/2008 | Smithson et al. |
| 2008/0039273 A1 | 2/2008 | Smithson et al. |
| 2008/0039274 A1 | 2/2008 | Smithson et al. |
| 2008/0039275 A1 | 2/2008 | Smithson et al. |
| 2008/0039276 A1 | 2/2008 | Smithson et al. |
| 2008/0039277 A1 | 2/2008 | Smithson et al. |
| 2008/0040008 A1 | 2/2008 | Smithson et al. |
| 2008/0070729 A1 | 3/2008 | Miller et al. |
| 2008/0073136 A1 | 3/2008 | Miller et al. |
| 2008/0073137 A1 | 3/2008 | Miller et al. |
| 2008/0073467 A1 | 3/2008 | Miller et al. |
| 2008/0079236 A1 | 4/2008 | Miller et al. |
| 2008/0081715 A1 | 4/2008 | Miller et al. |
| 2009/0164076 A1 | 6/2009 | Vasiliotis et al. |
| 2009/0280949 A1 | 11/2009 | Lohr |
| 2009/0312145 A1 | 12/2009 | Pohl et al. |
| 2010/0056322 A1 | 3/2010 | Thomassy |
| 2010/0093479 A1 | 4/2010 | Carter et al. |
| 2010/0093480 A1 | 4/2010 | Pohl et al. |
| 2010/0093485 A1 | 4/2010 | Pohl et al. |
| 2010/0131164 A1 | 5/2010 | Carter et al. |

FOREIGN PATENT DOCUMENTS

| | | |
|---|---|---|
| CN | 1157379 A | 8/1997 |
| DE | 498 701 | 5/1930 |
| DE | 1171692 | 6/1964 |
| DE | 2 310 880 | 9/1974 |
| DE | 2 136 243 | 1/1975 |
| DE | 2436496 | 2/1975 |
| DE | 39 40 919 A1 | 6/1991 |
| DE | 10155372 A1 | 5/2003 |
| DE | 20315691 U1 | 1/2004 |
| EP | 0 432 742 | 12/1990 |
| EP | 635639 A1 | 1/1995 |
| EP | 1136724 | 9/2001 |
| EP | 1366978 | 3/2003 |
| EP | 1811202 A1 | 7/2007 |
| FR | 620375 | 4/1927 |
| FR | 2590638 | 5/1987 |
| GB | 592320 | 9/1947 |
| GB | 906 002 A | 9/1962 |
| GB | 919430 A | 2/1963 |
| GB | 1 376 057 | 12/1974 |
| GB | 2 035 482 | 6/1980 |
| GB | 2 080 452 | 8/1982 |
| GB | 2339863 | 2/2000 |
| JP | 42-2844 | 2/1967 |
| JP | 47-29762 | 11/1972 |
| JP | 48-54371 | 7/1973 |
| JP | 49-12742 | 3/1974 |
| JP | 51-150380 | 12/1976 |
| JP | 47-20535 | 8/1977 |
| JP | 53 048166 | 1/1978 |

| | | |
|---|---|---|
| JP | 55-135259 | 4/1979 |
| JP | 59069565 | 4/1984 |
| JP | 63219953 | 9/1988 |
| JP | 02157483 | 6/1990 |
| JP | 02271142 | 6/1990 |
| JP | 03-149442 | 6/1991 |
| JP | 04-272553 | 9/1992 |
| JP | 52-35481 | 9/1993 |
| JP | 08170706 A | 7/1996 |
| JP | 09024743 A | 1/1997 |
| JP | 411063130 | 3/1999 |
| JP | 2003-336732 | 11/2003 |
| JP | 2004162652 A | 6/2004 |
| JP | 8-247245 | 9/2004 |
| JP | 2005/240928 A | 9/2005 |
| NE | 98467 | 7/1961 |
| TW | 582363 | 4/2004 |
| TW | 590955 | 6/2004 |
| WO | WO 01/73319 | 10/2001 |
| WO | WO 02/088573 | 11/2002 |
| WO | WO 2007/077502 | 7/2007 |
| WO | WO 2009/157920 | 12/2009 |
| WO | WO 2010/024809 | 3/2010 |
| WO | WO 2010/044778 | 4/2010 |

OTHER PUBLICATIONS

European Search Report dated Oct. 23, 2009 for European Patent Application No. 06838127.6, 8 pages.

Office Action dated Feb. 17, 2010 from Japanese Patent Application No. 2006-508892.

Office Action dated Feb. 12, 2010 from Japanese Patent Application No. 2009-294086.

International Search Report and Written Opinion dated Feb. 2, 2010 from International Patent Application No. PCT/US2008/068929, filed on Jan. 7, 2008.

* cited by examiner

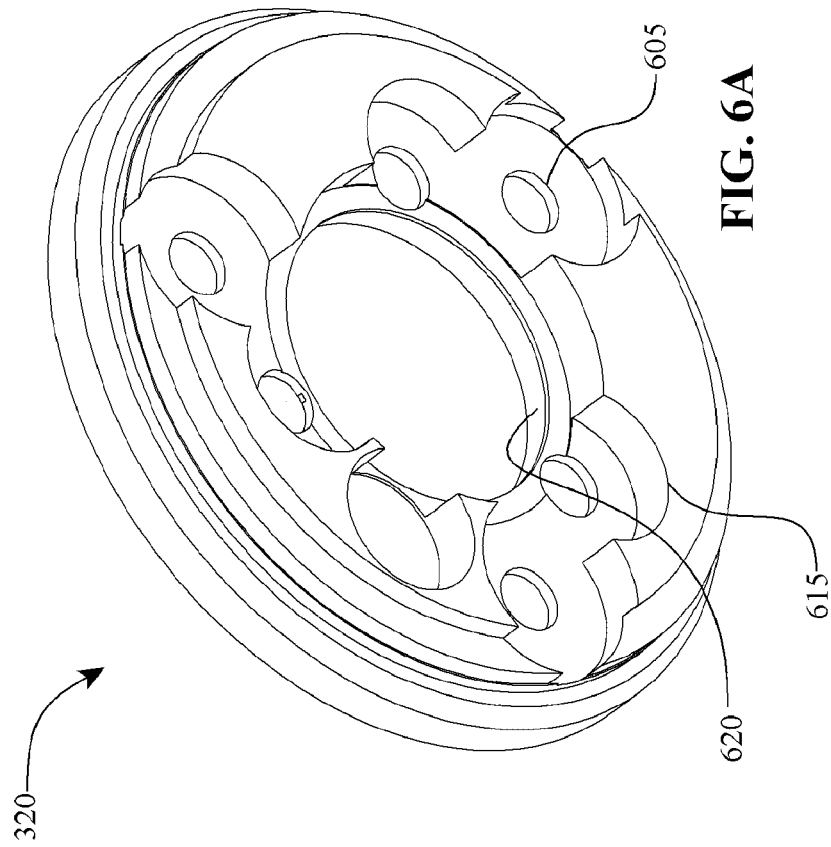
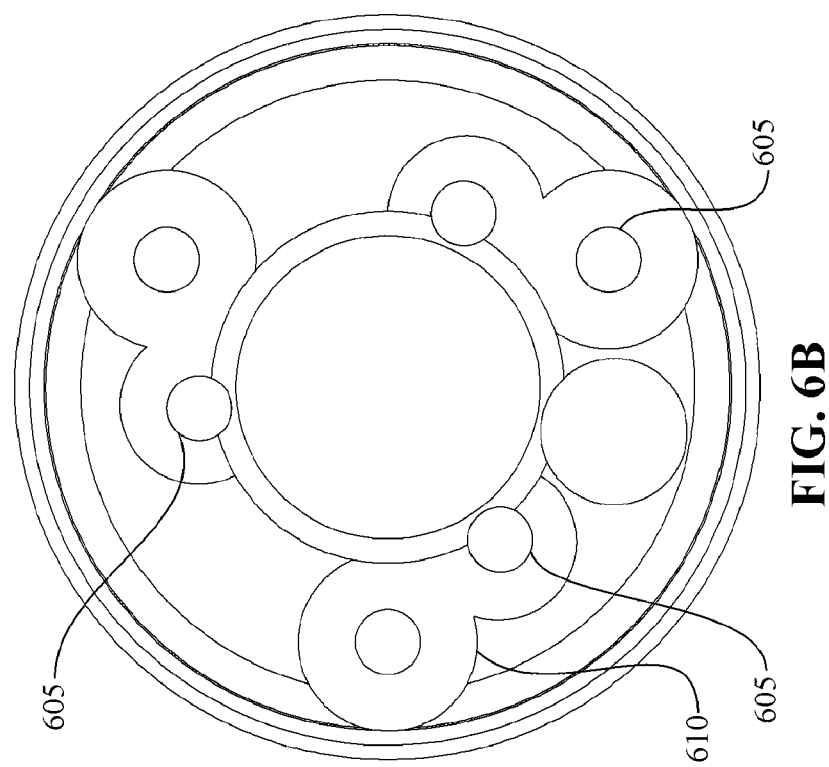

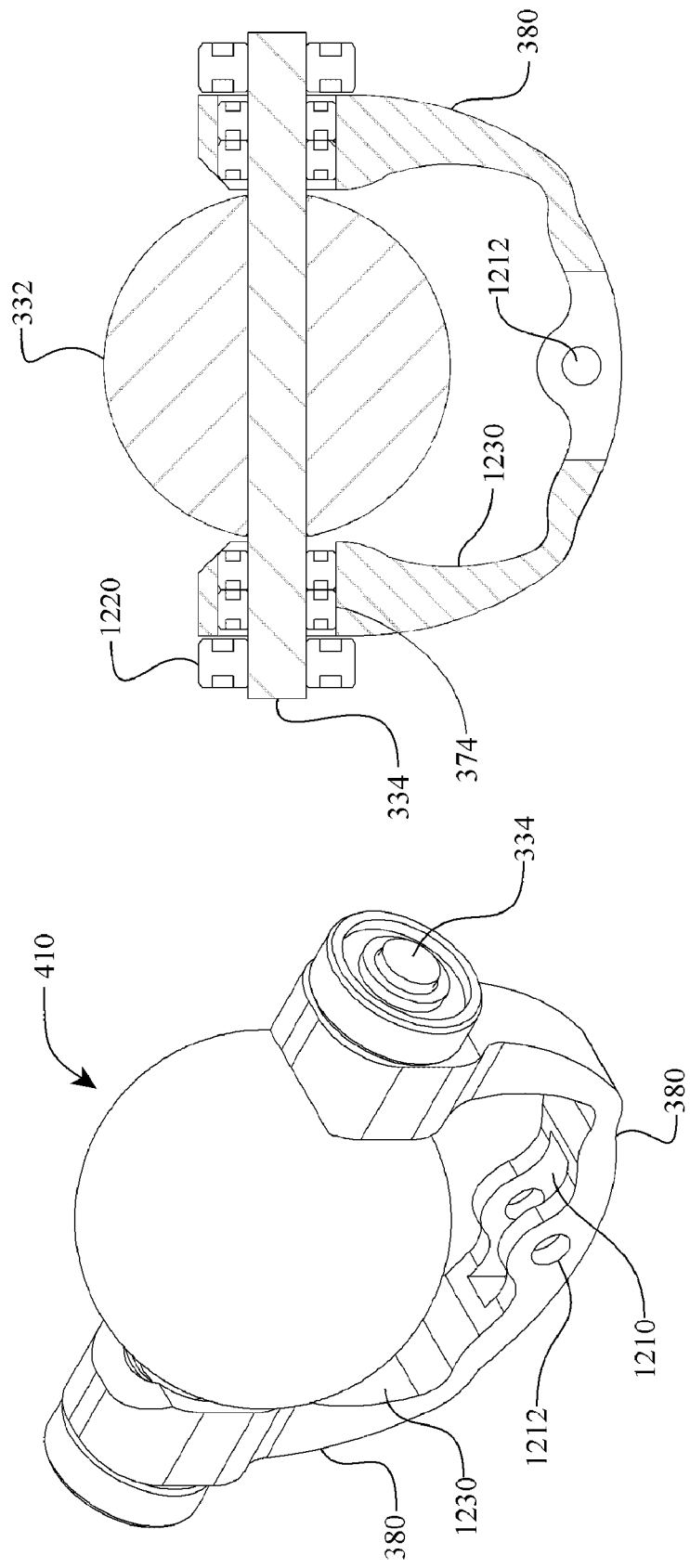

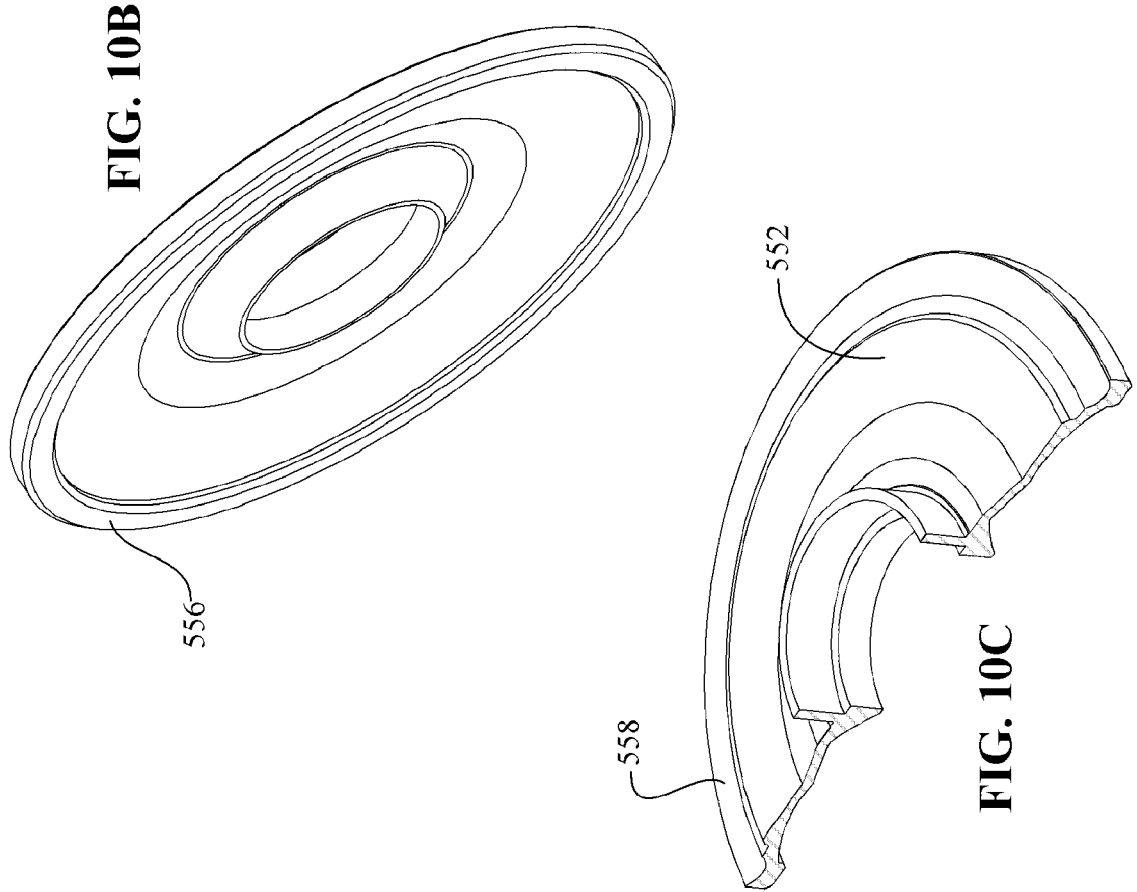
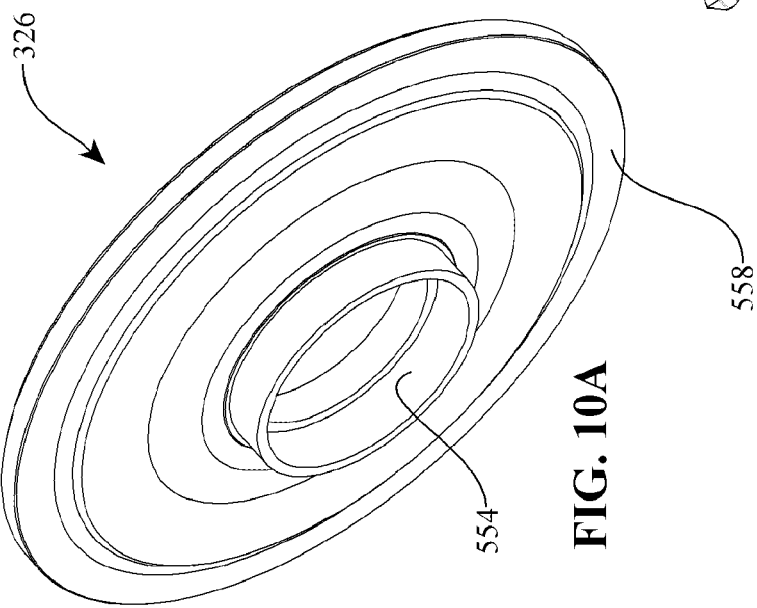
FIG. 10A
FIG. 10B
FIG. 10C

DETAIL A

CONTINUOUSLY VARIABLE TRANSMISSION

RELATED APPLICATIONS

This application is a continuation of U.S. patent application Ser. No. 11/562,317, which was filed on Nov. 21, 2006, and which claims priority to U.S. Provisional Patent Application No. 60/738,865, which was filed on Nov. 22, 2005. Each of the above-identified applications is hereby incorporated herein by reference in its entirety.

BACKGROUND OF THE INVENTION

1. Field of the Invention

The field of the invention relates generally to transmissions, and more particularly to continuously variable transmissions (CVTs).

2. Description of the Related Art

Embodiments of the CVTs disclosed here can be used in any machine, device, vehicle, etc., where it is desired to adjust the ratio of input speed to output speed. A bicycle is one such application. The drivetrain of a bicycle typically consists of pedals coupled to cranks for driving a crankshaft, which is received in, and supported by, frame members of the bicycle. The crankshaft is coupled to a sprocket that transfers power to the rear wheel of the bicycle by a chain. A cog at the rear wheel receives power from the chain and is adapted to interface with the rear wheel hub for driving the rear wheel of the bicycle. Some bicycles are provided with internally geared rear hubs, where a set of gears is arranged to receive power from the cog and drive the rear wheel. In some applications, a bicycle is provided with a CVT at the rear hub to drive the rear wheel.

However, there remains an unfulfilled need for a CVT that is received and supported by the frame members of the bicycle at a location forward of the rear wheel or rear wheel hub. The embodiments of the CVTs disclosed here address this and other needs in the field of continuously variable transmissions.

SUMMARY OF THE INVENTION

The systems and methods described herein have several features, no single one of which is solely responsible for the overall desirable attributes. Without limiting the scope as expressed by the claims that follow, the more prominent features of certain embodiments of the invention will now be discussed briefly. After considering this discussion, and particularly after reading the section entitled "Detailed Description of Certain Inventive Embodiments," one will understand how the features of the systems and methods provide several advantages over related traditional systems and methods.

One aspect of the invention relates to a bicycle having a plurality of bicycle frame members, a crankshaft operationally coupled to one or more cranks of the bicycle, and a continuously variable transmission (CVT) coaxially coupled with, and coaxially mounted about, the crankshaft.

Another aspect of the invention is addressed to a bicycle having a crankshaft coupled to a rotatable planetary gear set carrier coupled, and a plurality of planet gears coupled to said carrier. A ring gear, rotationally constrained, can be coupled to the planet gears, which can be coupled to a sun gear coupled. A first traction ring is operationally coupled to the sun gear, and a plurality of traction planets are coupled to the traction ring. A second traction ring is coupled to the traction planets. Power is transferred sequentially from the crankshaft to the planetary gear set carrier, to the planetary gears, to the sun gear, to the first traction ring, to the traction planets, and to the second traction ring. In another embodiment, the crankshaft is additionally coupled to a cage that is adapted to support the traction planets axially and radially and to transfer power to the traction planets.

Yet another aspect of the invention concerns a bicycle transmission having a planetary gear set configured for coupling to a crankshaft of a bicycle and to be mounted coaxially about the crankshaft. The bicycle transmission can further have a continuously variable variator coupled to the planetary gearset configured to be mounted coaxially about the crankshaft.

Still another aspect of the invention is directed to a shift screw and a shift pin hub for facilitating the adjustment of a transmission ratio. In another regard, the invention relates to a device for actuating an axial translation of an idler or traction sun as the transmission ratio is adjusted. In one embodiment, the traction sun actuation device includes a plurality of cam rollers configured to interface with a cam surface of a pivot arm. Another aspect of the invention covers the pivot arms having an integral cam surface for facilitating the axial translation of the traction sun.

In one aspect the invention is directed to a cage for a transmission. The cage has a plurality of splines for engaging corresponding splines of a transmission housing. The cage can further can a plurality of slots with skew roller reaction surfaces.

BRIEF DESCRIPTION OF THE FIGURES

FIG. 6A is a perspective view of a planetary gear set carrier that can be used with the transmission of FIG. 3.

FIG. 6B is an elevational side view of the planetary gear set carrier of FIG. 6A.

FIG. 8A is a perspective view of a planet-pivot-arm assembly that can be used with the transmission of FIG. 3.

FIG. 8B is a cross-sectional view of the planet-pivot-arm assembly of Figure A.

FIG. 10A is a perspective view of an input driver that can be used with the transmission of FIG. 3.

FIG. 10B is another perspective view of the input driver of FIG. 10A.

FIG. 10C is a cross-sectional view of the input driver of FIG. 10A.

DETAILED DESCRIPTION OF CERTAIN INVENTIVE EMBODIMENTS

Reference will now be made in detail to the present embodiments(s) (exemplary embodiments) of the invention, an example(s) of which is (are) illustrated in the accompanying drawings. Wherever possible, the same reference numbers will be used throughout the drawings to refer to the same or like parts (elements).

The CVT embodiments described here are generally related to those of the type disclosed in U.S. Pat. Nos. 6,241,636; 6,419,608; 6,689,012; and 7,011,600. The entire disclosure of each of these patents is hereby incorporated herein by reference. Additionally, U.S. patent application Ser. No. 10/788,736 (now U.S. Pat. No. 7,011,600) was included as Appendix A of the provisional application from which this application claims priority. The disclosure of U.S. patent application Ser. No. 11/543,311, filed Oct. 3, 2006, is hereby incorporated by reference herein in its entirety.

The preferred embodiments will now be described with reference to the accompanying figures, wherein like numerals refer to like elements throughout. The terminology used in the description presented herein is not intended to be interpreted in any limited or restrictive manner simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

As used here, the terms "operationally connected," "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the term indicates that the actual linkage or coupling may take a variety of forms, which in certain instances will be obvious to a person of ordinary skill in the relevant technology.

For description purposes, the term "radial" is used here to indicate a direction or position that is perpendicular relative to a longitudinal axis of a transmission or variator. The term "axial" as used here refers to a direction or position along an axis that is parallel to a main or longitudinal axis of a transmission or variator. For clarity and conciseness, at times similar components labeled.

Figure 1:
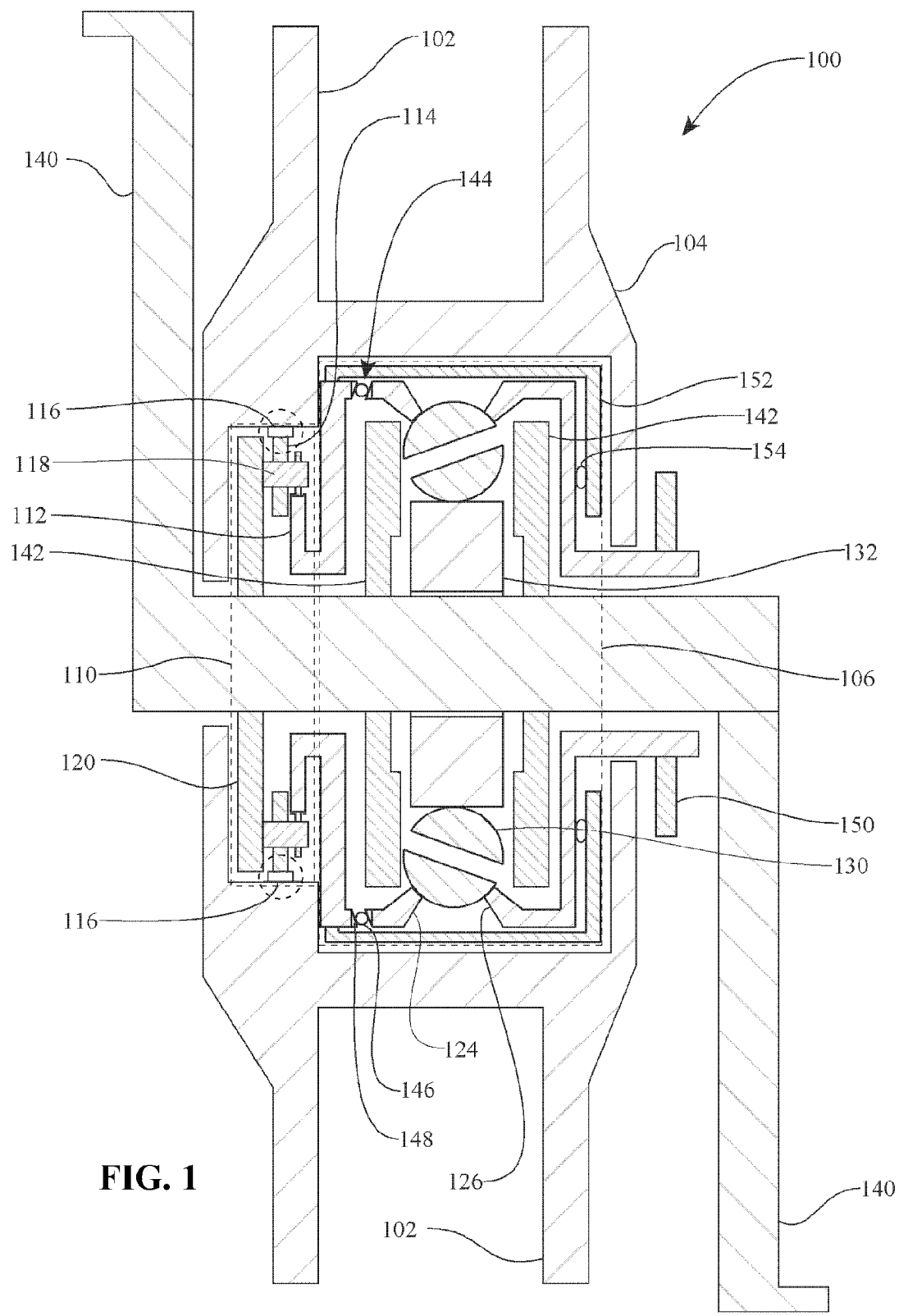
FIG. 1 is schematic cross-section of continuously variable transmission (CVT) implemented on the frame of a bicycle.

FIG. 1 illustrates one embodiment of a bicycle transmission 100 mounted in a bicycle frame 102 rather than the rear hub of the bicycle (not shown). The illustrated embodiment integrates a support structure 104 of the transmission into the frame 102 of the bicycle. The major components of the transmission 100 include a variator 106, a planetary gear set 110 and a support structure 104. The planetary gear set 110 of the illustrated embodiment includes a central sun gear 112, a set of planet gears 114 that orbit and surround the sun gear 112, a set of planet gears 114 that orbit and surround the sun gear 112, and a ring gear 116 that surrounds the set of planer gears 114. In FIG. 1, a dashed circle is used to better illustrate the location of the ring gear 116 that, in the illustrated embodiment, is integrated with the support structure 104. Each of the planet gears 114 rotates about a respective planet shaft 118, and a planet carrier 120 supports the planet shafts 118. In the exemplary embodiment of FIG. 1, the planet gears 114 are compound planetary gears.

As described in the embodiments described in U.S. Pat. No. 7,011,600, the variator 106 of the illustrated embodiment includes an input ring 124, an output ring 126, and a set of planet balls 130 in contact with, and between, the input ring 124 and the output ring 126. An idler 132 is placed between, and in contact with, the planet balls 130, and is analogous to the sun gear 112 of the planetary gear set 110. The variator 106 operates as illustrated and described in U.S. Pat. No. 7,011,600.

Cranks 140 of a bicycle provide torque input into the planet carrier 120. The planet carrier 120 rotates the planet gears 114 about the sun gear 112. The ring gear 116 is fixed and the planet gears 114 drive the sun gear 112. The ring gear 116 is fixed, and the planet gears 114 drive the sun gear 112. The planet carrier 120 is connected to the cage 142 of the variator 106. The sun gear 112 is connected to the input ring 124 via a cam loader 144, a set of bearings 146 and ramps 148 that generates axial force that is proportional to the amount of torque applied, although any axial force generating mechanism described in U.S. Pat. No. 7,011,600 or known or described in previous publications can be used. Therefore, in the illustrated embodiment, torque is supplied to the variator 106 from both the sun gear 112, via the input ring 124, and the carrier 120, via the cage 142. The variator 106 takes and sums the two torque inputs and varies the output speed to the output ring 126 and out via an output sprocket 150. The illustrated embodiment includes an optional reaction sleeve 152 to react the axial force generated as well as a thrust bearing 154 for reacting the axial thrust generated to clamp the input ring 124 and the output ring 126 to the planet balls 130.

Figure 2:
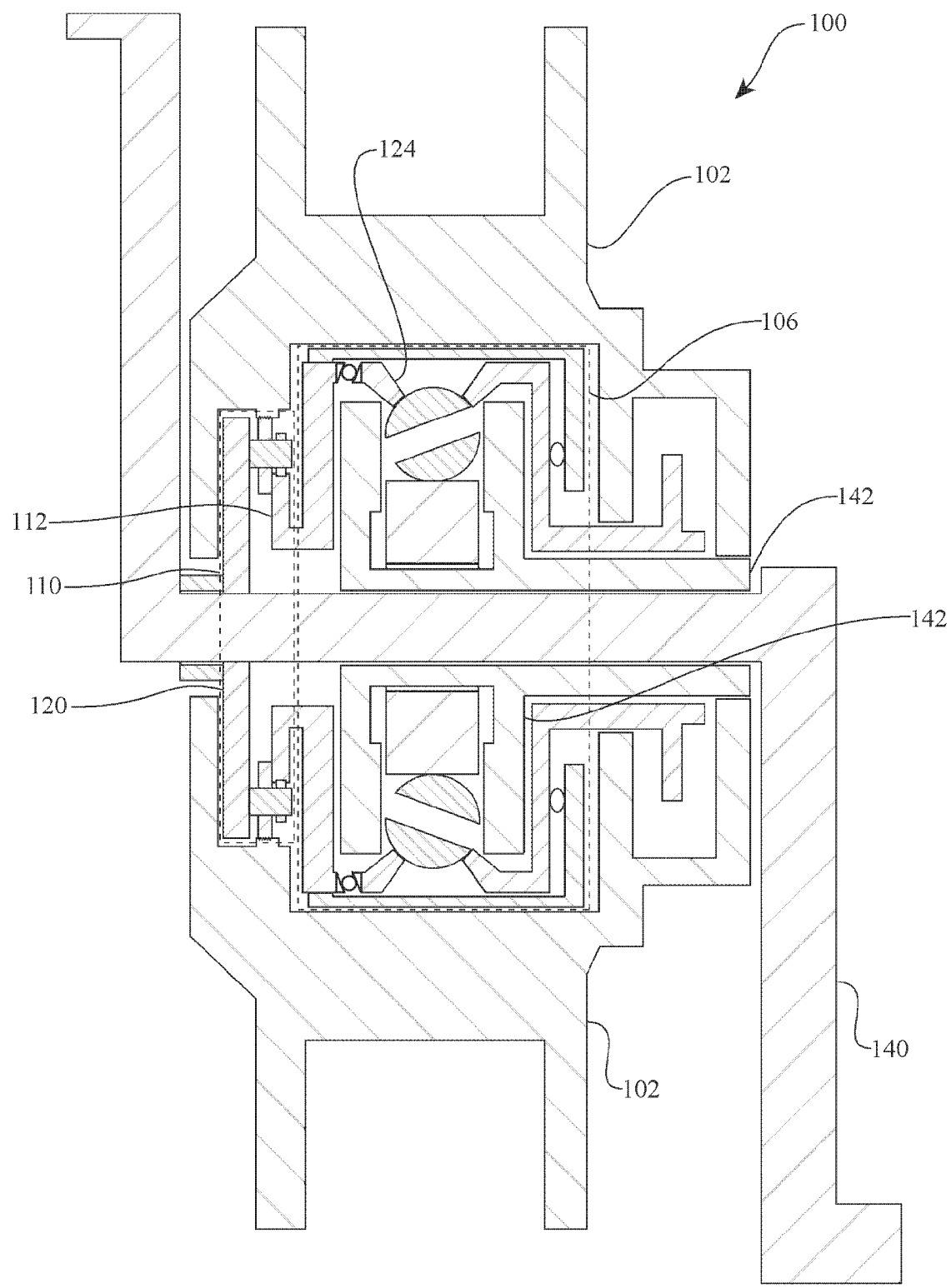
FIG. 2 is a schematic cross-section of yet another embodiment of a CVT implemented on the frame of a bicycle.

In the embodiment illustrated in FIG. 2, a second embodiment is illustrated that also utilizes the planetary gear set 110 as an input to the variator 106. In this embodiment, torque again is applied from the cranks 140 to the carrier 120 and output through the sun gear 112. In this embodiment, however, the carrier 120 is not attached to the cage 142 and, therefore, torque is only input to the variator 106 through the input ring 124 while the cage 142 is fixed to the frame 102.

An alternative transmission 300 will now be described with reference to FIGS. 3-13D. The transmission 300 can use components similar to those described above with reference to the embodiments of the transmission 100. However, the use of a similar or identical reference name for a component does not necessarily introduce into an embodiment (or aspect of the embodiment) any characterizations associated with a previously described embodiment.

Figure 3:
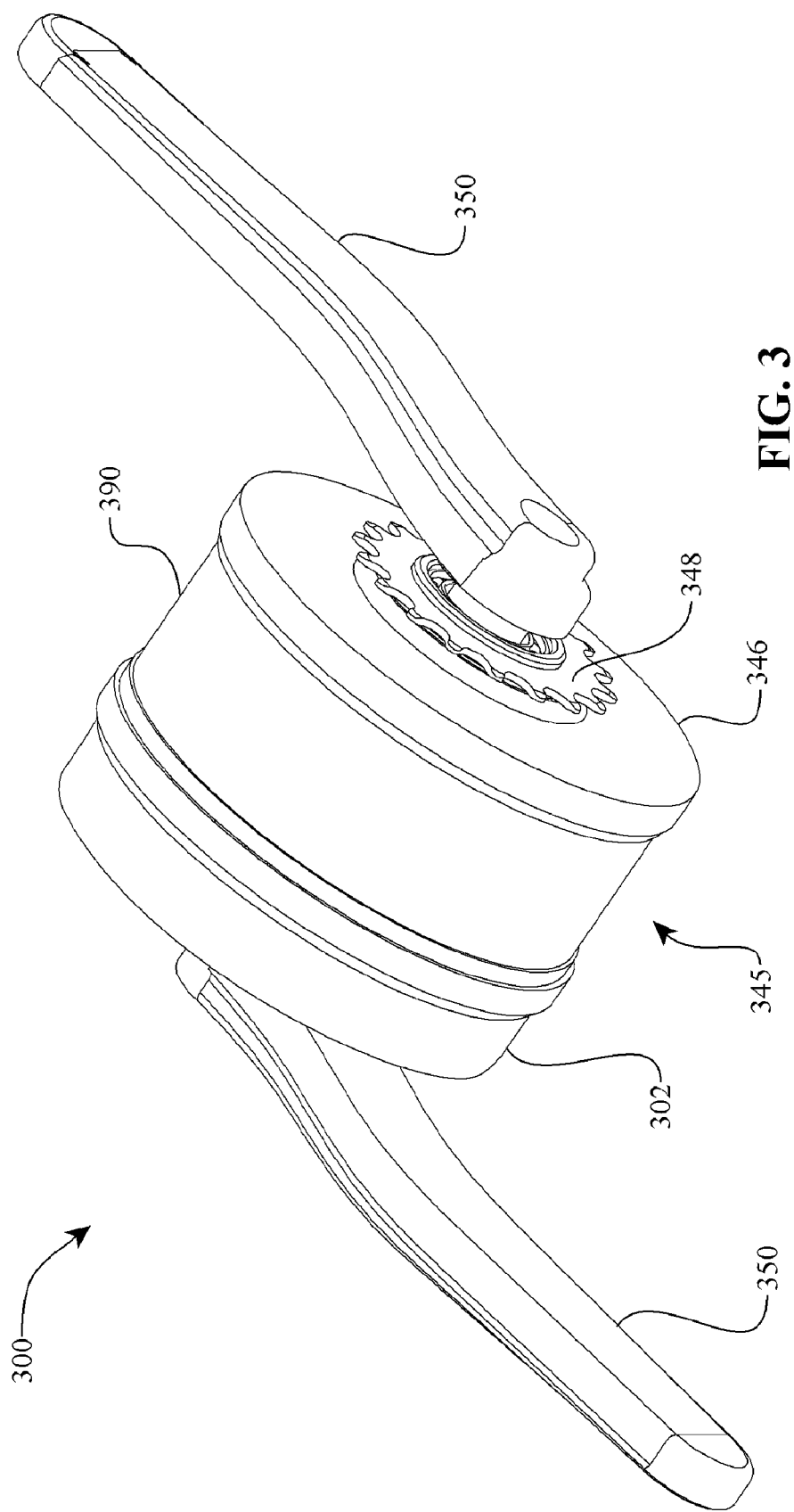
FIG. 3 is a perspective view of still another embodiment of a CVT that can be implemented, among other things, on the frame (such as the bottom bracket) of a bicycle.
Figure 4A:
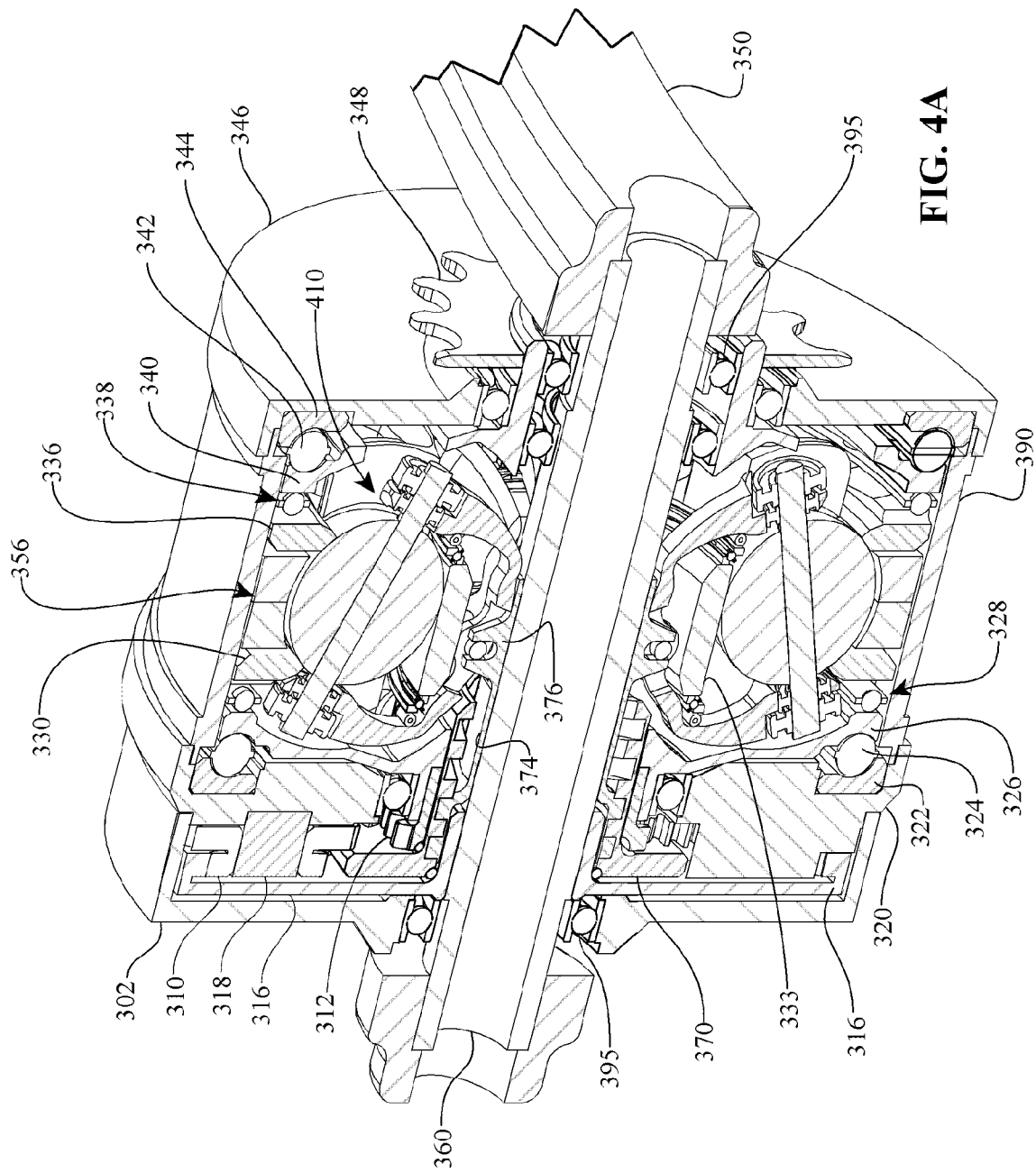
FIG. 4A is a perspective, cross-sectional view of the transmission of FIG. 3.
Figure 4B:
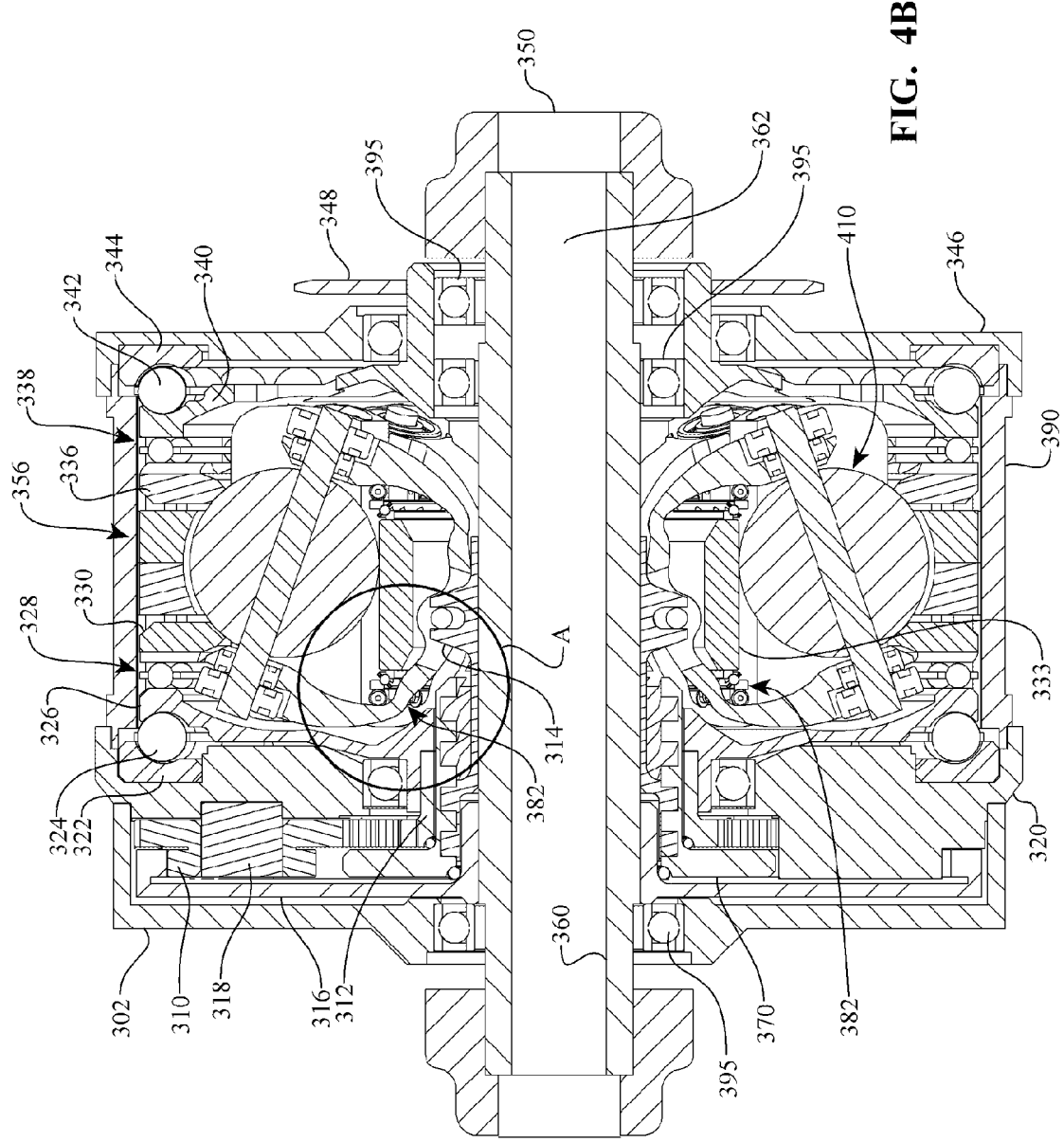
FIG. 4B is a cross-sectional view of the transmission of FIG. 3.
Figure 4C:
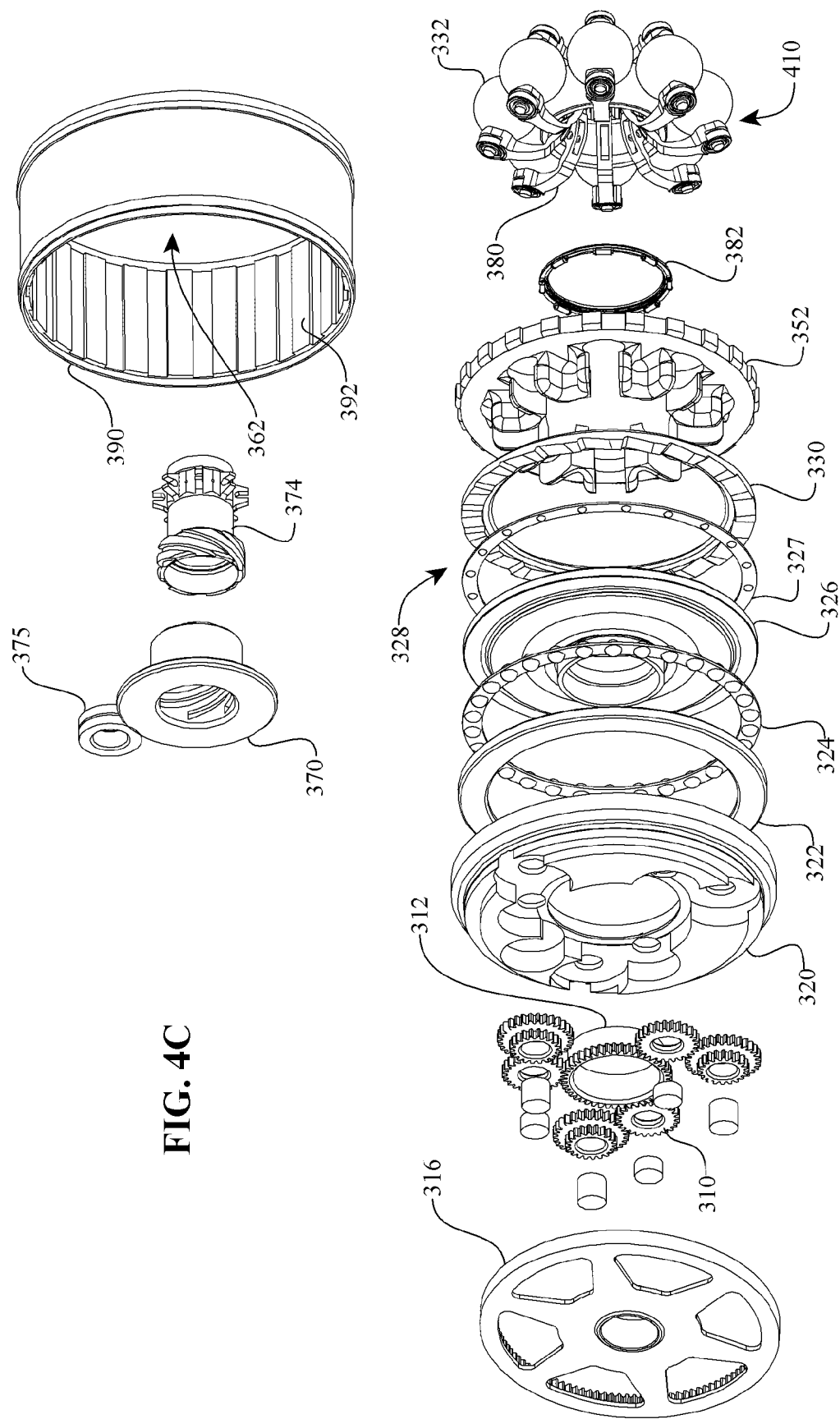
FIG. 4C is a partial, exploded view of certain assemblies and components of the transmission of FIG. 3.
Figure 4D:
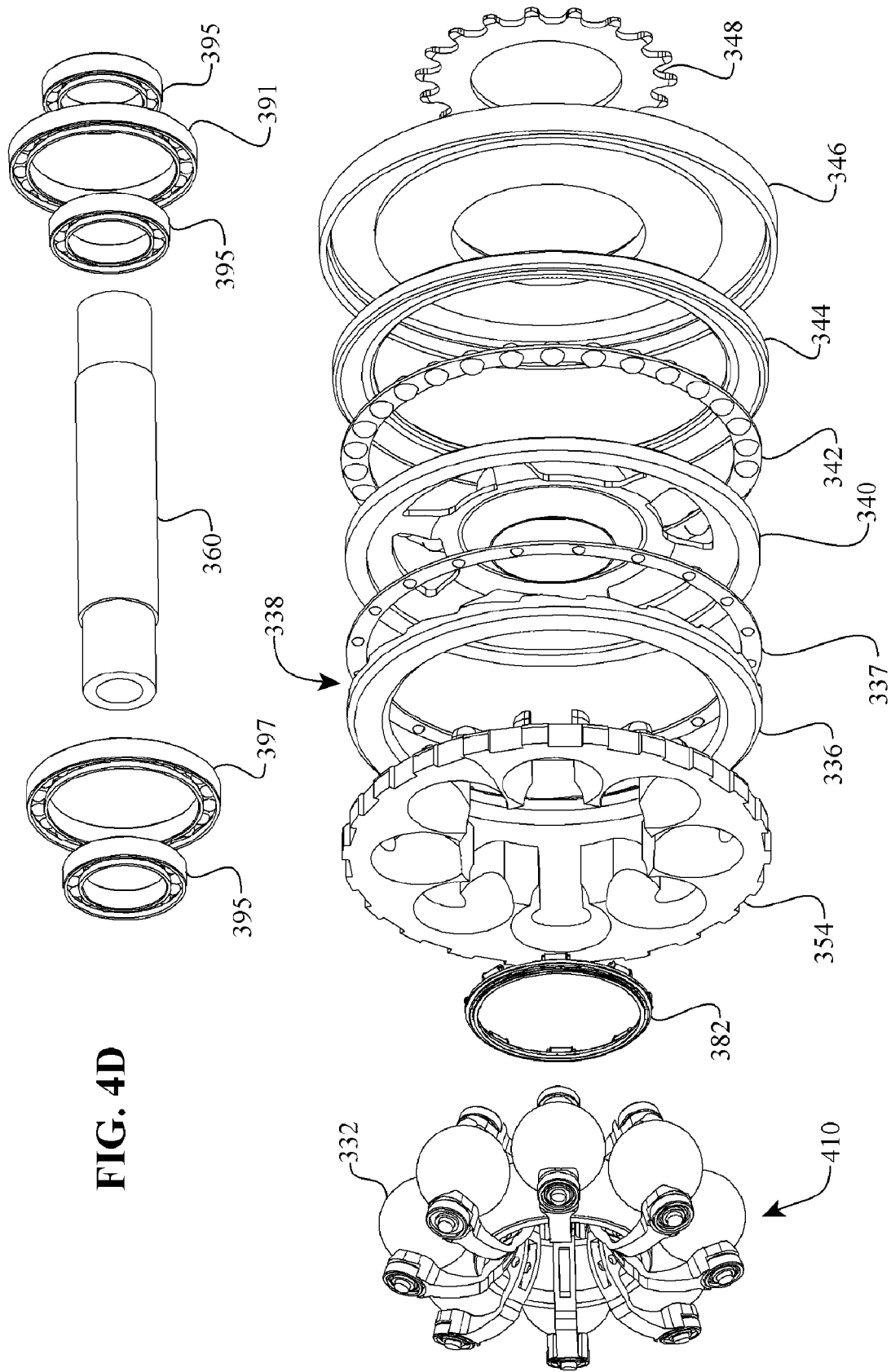
FIG. 4D is a partial, exploded view of certain assemblies and components of the transmission of FIG. 3.

FIG. 3 is a perspective view of the transmission 300. In one embodiment (in a bicycle application, for example), power can be provided to the transmission 300 via cranks 350, and power can be delivered out of the transmission 300 via a sprocket 348. The transmission 300 can include a central hub shell 390 that, along with end caps 302 and 346, forms a housing 345 for most of the components of the transmission 300. In one embodiment, the housing 345 can be configured to be implemented on a bicycle frame, such as in the bottom bracket of the bicycle, for example. However, the transmission 300 can be used in any machine or vehicle where it is desired to adjust the ratio of input speed to output speed, or vice versa. That is, although various embodiments and features of the transmissions described herein are discussed with reference to a bicycle application, a person of ordinary skill in the relevant art will readily recognize modifications of and to the transmission 300, and features thereof, that can be used in any vehicle, machine, or device that uses a transmission to adjust the ratio of input to output speeds.

Referencing FIGS. 4A-4D now, an exemplary embodiment of certain assemblies and components of the transmission 300 will now be described. In one embodiment, the transmission 300 can include a set of planet-pivot-arm assemblies 410 positioned between an input traction ring 330 and an output traction ring 336. The planet-pivot-arm assemblies 410 can include an array of traction planets 332 in contact with the input traction ring 330, the output traction ring 336, and a traction sun 333. The transmission 300 can include an input driver 326 for operationally driving the input traction ring 330. The output traction ring 336 is configured to operationally driver the output driver 340. Preferably, the transmission 300 includes an input load cam 328 positioned between the input driver 326 and the traction ring 330. The transmission preferably also includes an output load cam 338 located between the output traction ring 336 and the output driver 340. In the embodiment illustrated, a cage 356 is provided to support and guide the planet-pivot-arm assemblies 410, as well as to provide stiffness and/or rigidity to the transmission 300. It should be noted that the previous recitation of components of the transmission 300 can be expanded or reduced, and that enumerated members can be combined together and continue to perform their intended functions, without departing from the scope of present invention.

The cranks 350 are coupled to provide torque to a crank shaft or central shaft 360, which is generally positioned and supported in the housing 345 by bearings 395. The central shaft 360 can also be configured to provide radial and axial support for certain assemblies of the transmission 300. For purposes of description, the central shaft 360 defines a longitudinal axis of the transmission 300 that will serve as a reference point for describing the location and or motion of other components of the transmission 300. As used here, the terms "axial," "axially," "lateral," "laterally," refer to a position or direction that is coaxial or parallel with the longitudinal axis defined by the central shaft 360. The terms "radial" and "radially" refer to locations or directions that extend perpendicularly from the longitudinal axis.

In one embodiment, the cranks 350 couple to a first stage planetary gear set via the central shaft 360. The first stage planetary gear set includes sun gear 312, compound planetary gears 310, carrier 320, and ring gear 316. The central shaft 360 couples to the ring gear 316. The carrier 320 is configured to receive and support, on planetary gear axles 318, the compound planetary gears 310. In one embodiment, the carrier 320 is rotationally and axially fixed, and can be part of (or attached to) the housing 345.

The ring gear 316 drives the compound planetary gears 310, which orbit around and drive the sun gear 312. The input driver 326 is coupled to and receives torque from the sun gear 312. The input driver 326 delivers torque via the input load cam 328 to the input traction ring 330, which transfers torque to the planet-pivot-arm assemblies 410. The output driver 340 receives torque from the planet-pivot-arm assemblies 410 via the output traction ring 340 and output load cam 338. The output driver 340 is coupled to and delivers torque to the sprocket 348. Although a sprocket is used in this example, other embodiments of the transmission 300 can use a pulley, a freewheel, a cog, etc.

In some embodiments, the input traction ring 330 and the output traction ring 340 are substantially similar. A traction ring 330, 340 preferably includes a traction surface for transmitting torque through frictional or hydroelastodynamic contact with the traction planets 332. In some embodiments, a traction ring 330, 340 can include ramps that form part of a load cam assembly (see FIG. 10). The traction surface of the traction ring 330, 340 can be inclined at about 45 degrees from vertical, which in this case refers to a plane surface extending radially.

Figure 9:
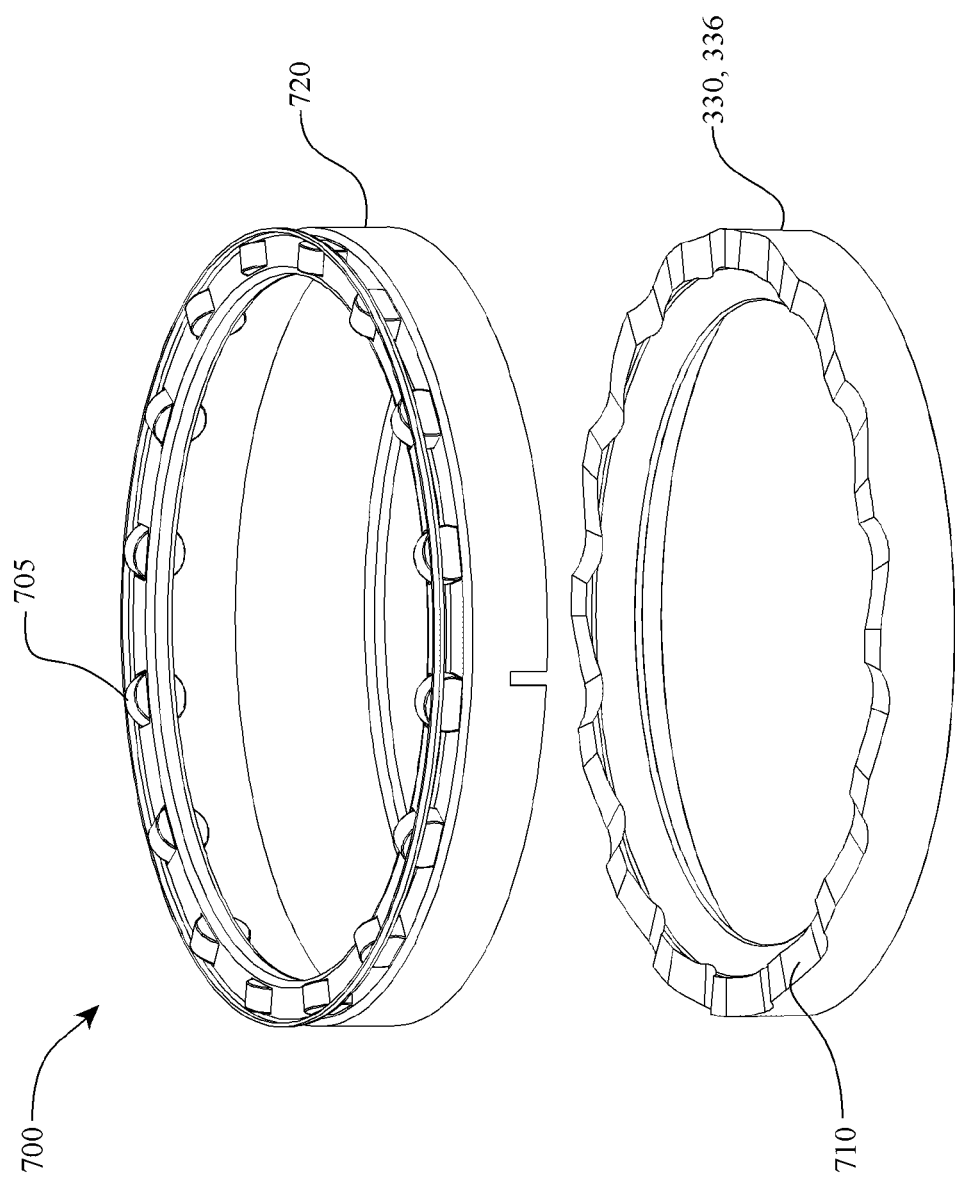
FIG. 9 is a perspective view of a traction ring and clamping force generation assembly that can be used with the transmission of FIG. 3.

A cage 356 includes an input cage 352 and an output cage 354 (see FIGS. 7A-7C), and circumscribes and supports the planet-pivot-arm assemblies 410, as depicted in FIGS. 4A-4D. A planet-pivot-arm assembly 410 can include a traction planet 332. The traction planets 332 are in contact with and are radially supported by the traction sun 333. An exemplary planet-pivot-arm assembly 410 is depicted in FIG. 9. The traction sun 333 can be a generally cylindrical tube. In some embodiments, the traction sun 333 has a generally constant outer diameter; however, in other embodiments the outer diameter is not constant. The outer diameter may be smaller at the center portion than at the ends, or may be larger at the center and smaller at the ends. In other embodiments, the outer diameter is larger at one end than at the other and the change between the two ends may be linear or non-linear depending on shift speed and torque requirements.

A planet-pivot-arm assembly 410 can have pivot arms 380, which can be operationally coupled to a traction sun actuation device 382 (see FIGS. 4B and 13A-13D). As will be discussed further below, the traction sun actuation device 382 can be used to translate axially the traction sun 333 when the speed ratio of the transmission 300 is adjusted. The pivot arms 380 can be coupled to a shift pin hub 374 via hub pin fingers 376 (see FIG. 13A) and shift pins (not shown). The shift pin hub 374 can be used to actuate the planet-pivot-arm assembly 410 in response to a shifting input. Shifting, or adjustment of the speed ratio, of the transmission will be further described below with reference to FIGS. 11A-12B.

To handle axial reaction forces and provide a rolling contact between moving and stationary members of the CVT 300, thrust bearings can be provide on either or both of the input and output ends of the CVT 300. At the input side, generally referring to the area where the central shaft 360 couples to the ring gear 316, an input thrust bearing is located between the stationary, first stage planetary carrier 320 and the input driver 326. The input thrust bearing, in the embodiment illustrated in FIG. 4, includes an input bearing race 322 that is received and supported in a recess of the carrier 320. The input thrust bearing also has a set of rollers 324 that can be positioned and supported by a roller retainer. The rollers 324 can be balls, barreled rollers, asymmetrical rollers or any other type of rollers. In one embodiment, the input driver 326 is provided with an integral bearing race that cooperates with the rollers 324 and the input bearing race 322 to complete the input thrust bearing.

On the output side, generally referring to the area where the output driver 340 is located, an output thrust bearing can be positioned between the output driver 340 and the end cap 346, which can have a recess for receiving and support an output bearing race 344. Thus, in this embodiment, the end cap 346 helps to react the axial forces that arise in the transmission 300. The bearing races 322, 344 can be made of various bearing race materials such as steel, bearing steel, ceramic or any other material suitable for bearing races. The output thrust bearing includes a set of rollers 342 positioned and supported in roller retainer. In one embodiment, the output driver 340 can have an integral bearing race that cooperates with the output bearing race 344 and the rollers 342 to complete the output thrust bearing.

Figure 5:
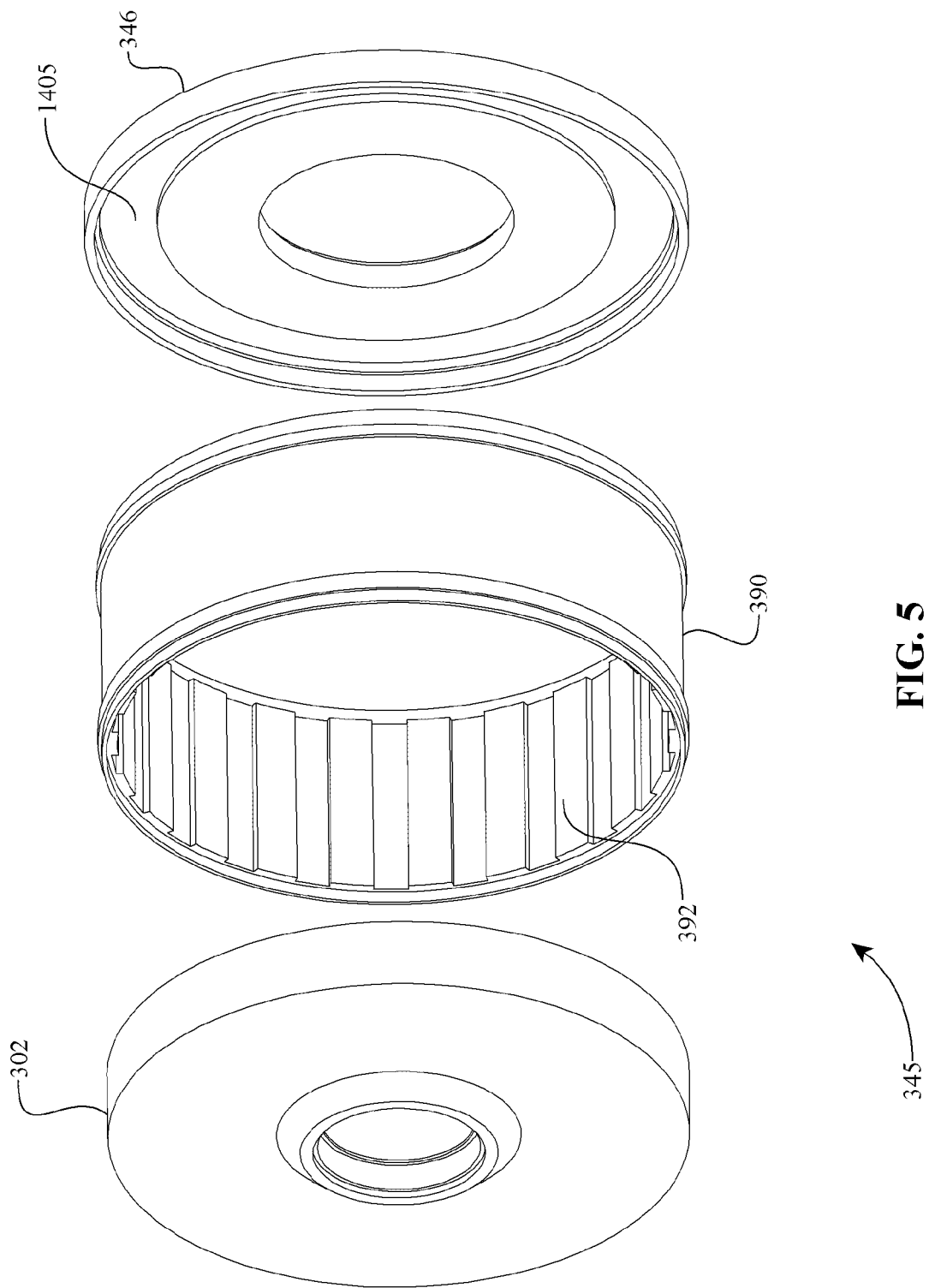
FIG. 5 is a perspective, partially exploded view of certain components of a housing for the transmission of FIG. 3.

Referencing FIG. 5 now, in one embodiment, the housing 345 includes a central hub shell 390, an input end cap 302, and an output end cap 346. In one embodiment, the end caps 302, 346 fasten to the central hub shell 390 with fasteners (not shown); however, the ends cap 302, 346 can also thread into, or can otherwise be attached to the central hub shell 390. The central hub shell 390 can be provided with internal splines 392 formed integral with the inside of the hub shell 390 to engage with complimentary splines 925 of the cage 356. The end caps 302, 346 are generally flat discs, although either or both can have a curved shape or other configuration. As shown in FIG. 5, the end cap 346 can be provided with a recess 1405 adapted to receive and support the output bearing race 344. The central bores of the end caps 302, 346 can be adapted to receive the bearings 395 for providing positioning and rolling contact with respect to other components of the transmission 300. The end caps 302 and 346 can be made of, for example, aluminum, titanium, steel, high strength thermoplastics, or thermoset plastics. Depending on the embodiment, the end caps 302 and 346 are preferably made of a material suitable to provide rigidity and stiffness to the transmission 300, as well as to react the axial forces that arise in the transmission 300 during operation.

Turning to FIGS. 6A-6B now, the first stage planetary carrier 320 can be adapted by machining, or formed as an integral piece, to be capable of axially and radially supporting the compound planetary gears 310. The carrier 320 includes bore holes 605 adapted to secure and receive the planetary shafts 318. The carrier 320 can include cavities 610 and 615 formed integral with the carrier 320 to receive the compound planetary gears 310. A central bore 620 of the carrier 320 can be configured to receive a bearing 396, which serves to locate, and provide a rolling interface for, the input driver 326 (see FIG. 4B, for example). As previously mentioned, in some embodiments that carrier 320 can be configured to form part of the housing 345 and/or to receive and support the bearing race 322.

Figure 7C:
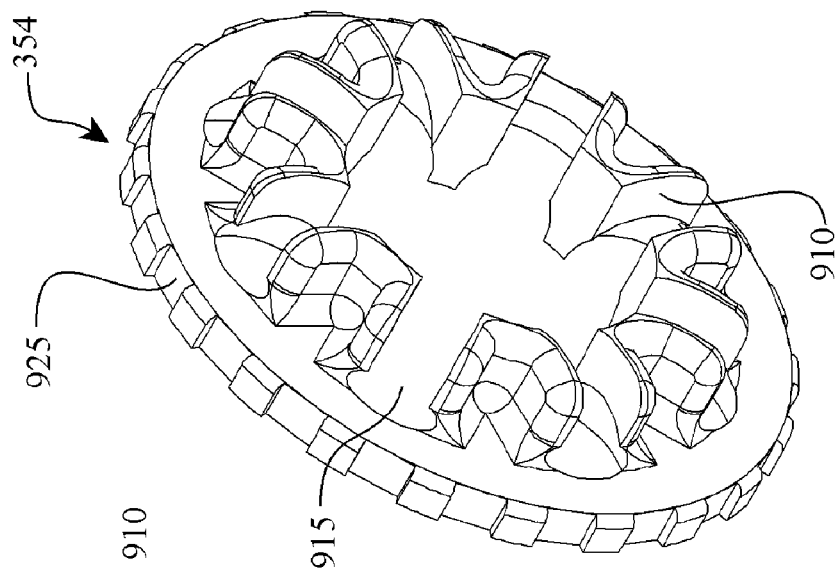
FIG. 7C is a second perspective view of the cage component of FIG. 7B.
Figure 7B:
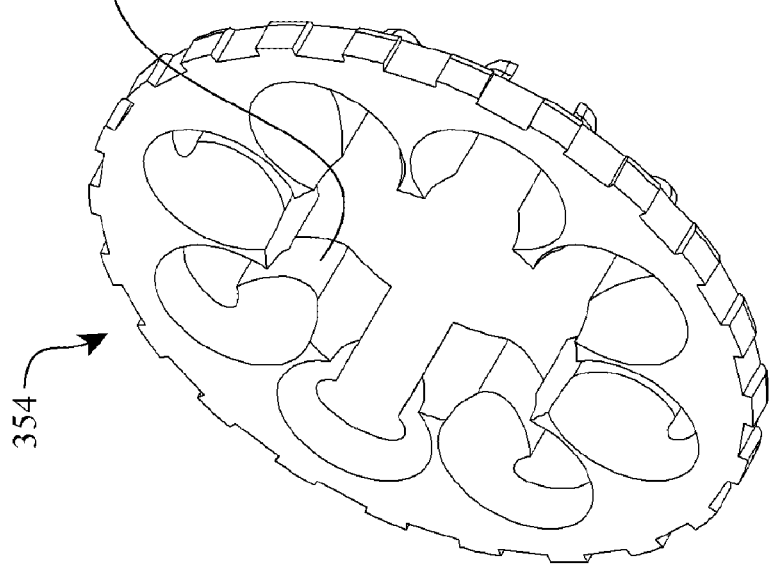
FIG. 7B is a perspective view of a cage component of the cage of FIG. 7A.
Figure 7A:
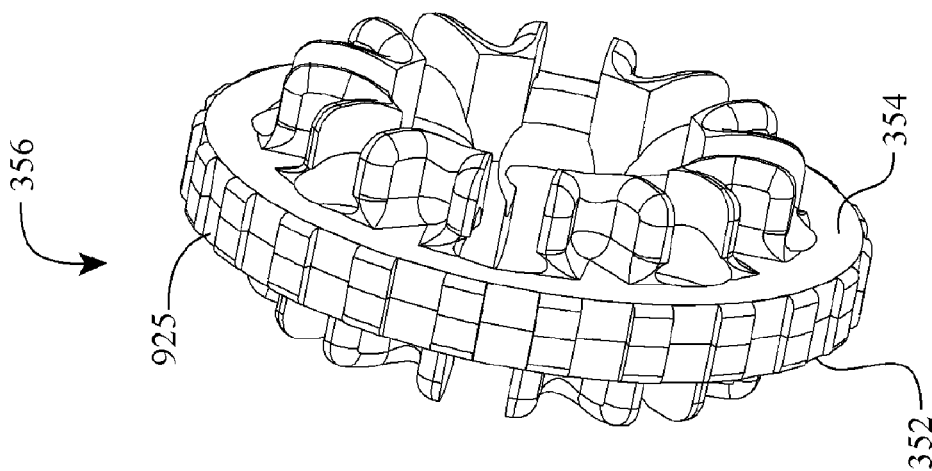
FIG. 7A is a perspective view of a cage that can be used with the transmission of FIG. 3.

Passing to FIGS. 7A-7C, a cage 356 can have two halves, input cage half 352 and input cage half 354. In one embodiment, the cage halves 352, 354 can be substantially similar. Hence, the cage halves 352, 354 can be interchangeable. Is some embodiments, the cage 356 is shaped to provide a stationary, reaction support structure for the pivot arms 380; that is, the cage 356 is configured to provide the angular alignment (about the longitudinal axis of the central shaft 360) for the pivot arms 380 (and consequently, the traction planet axles 334) as the pivot arms 380 pivot radially inward and outward about the traction planets 332 during shifting of the transmission ratio.

In one embodiment, the slots 915 of the cage 356 guide the planet-pivot-arm assemblies 410 along skew surfaces 910 through contact with the skew rollers 1220. The skew surfaces 910 provide reaction surfaces for the skew rollers 1220 as the planet-pivot-arm assemblies 410 pivot or tilt in slot 915 when the transmission ratio of the CVT 300 is adjusted. In some embodiments, the corresponding slots of cage halves 352, 354 are offset slightly in the angular direction, relative to one another, to reduce potential deleterious effects on shifting, for example, that can be caused by skewing (relative to a lateral axis) of the traction planet axles 334 (see FIG. 9A).

Turning to FIGS. 8A and 8B now, in one embodiment, the planet-pivot-arm assembly 410 can include a traction planet 332, a traction planet axle 334, and pivot arms 380 having a slotted joint 1210. The planet-pivot-arm assembly 410 can also include skew rollers 1220, which are rolling elements attached to each end of a pivot arm axle 334 and provide for rolling contact of the traction planet axle 334 along skew surfaces 910 of the input cage 352 and output cage 354. The planet-pivot-arm assembly 410 can include bearings 374. The skew rollers 1220 and the bearings 374 can be supported by the traction planet axle 334. The traction planet axle 334 passes through a bore formed in the radially outward end of a pivot arm 380.

In one embodiment, the pivot arms 380 are machined with a curvature suitable to axially translate the traction sun 333 in reaction to a shift mechanism input. The pivot arms 380 can be provide with a cam surface 1230. As will be further described below with reference to FIGS. 13A-13D, the curvature of the cam surface 1230 can be configured to produce a desired axial translation of the traction sun 333 during shifting of the transmission ratio.

The traction planet axle 334 can be a generally cylindrical shaft that extends through a bore formed through the center of the traction planet 332. In some embodiments, the traction planet axle 334 interfaces with the surface of the bore in the traction planet 332 via needle or radial bearings that align the traction planet 332 on the traction planet axle 334. The traction planet axle 334 extends beyond the sides of the traction planet 332 where the bore ends so that the pivot arms 380 can actuate a shift in the position of the traction planet 332. Where the traction planet axle 334 extends beyond the edge of the traction planet 332, it couples to the radial outward end of the pivot arms 380. The traction planet axle 334 passes through a bore formed in the radially outward end of the pivot arms 380.

In various embodiments, the interface between the traction planets 332 and the traction planet axles 334 can be any of the bearings described in other patents or publications. In some embodiments, the traction planets 332 are fixed to, and rotate with, the planet axles 334. In the embodiment of FIG. 8A, the bearings 374 are positioned between the traction planet axles 332 and the pivot arms 380 such that the transverse forces acting on the traction planet axles 332 are reacted by the pivot arms 380 as well as, or alternatively, the cage 356. In some such embodiments, the bearings 374 can be radial bearings (balls or needles), journal bearings, or any other type of bearings or suitable mechanism.

Typically, traction-type transmissions use a clamping mechanism to prevent slippage between the traction planets 332 and the traction rings 330, 336 when transmitting certain levels of torque. Provision of a clamping mechanism is sometimes referred to here as generating an axial force, or providing an axial force generator. With reference to FIGS. 4A-4D and 9, clamping force generation mechanisms that can be used with the transmission 300 will now be described.

As mentioned above with reference to FIGS. 4A-4D, some embodiments of the transmission 300 preferably include an input load cam 328 and/or an output load cam 338. The following discussion of a load cam 700 applies equally to both load cams 328, 338. In one embodiment, a load cam 700 includes load cam rollers 705 and ramps 710, which can be formed integral with a traction ring, such as input or output traction rings 330 and 336. The rollers 705 can be supported and positioned in a suitable roller retainer, for example roller retainer 720. In some embodiments, a traction ring 330, 340 can includes about 16 ramps 710, with each ramp 710 having about a 10 degree incline. In certain embodiments, the ramps 710 are helical and have a lead equivalent to about 55-66 mm over a 160-degree span. The input load cam 328 includes rollers 327 and ramps integral with the input traction ring 330, and the output load cam assembly 338 includes rollers 337 and ramps integral with the output traction ring 336. The rollers 705, 327, 337 can be spherical, cylindrical, barreled, asymmetrical or other shape suitable for a given application.

In some embodiments, the ramps 710 are provided on a ring that is fastened to the input driver 326 or to the input traction ring 330; alternatively, each of the input driver 326 and the input traction ring can be fitted with rings having the ramps 710. In some embodiments, the input traction ring 330 and the load cam assembly 328 are an integral unit, effectively as when the ramps 1610 are built into the input traction ring 330, and the rollers 705 and roller retainer 720 form a distinct assembly.

During operation of the transmission 300, the first stage planetary sun gear 312 imparts torque to the input driver 326. The input driver 326 transfers torque to the input traction ring 330 via the ramps 710, which can be integral with the input traction ring 330. As the input driver 326 rotates, the ramps 710 activate the rollers 705, which ride up the ramps 710. The rollers 705 wedge in place, pressed between the ramps 705 and a surface of the input driver 326, and transmit both torque and axial force through the ramps 705 from the input driver 326 to the input traction ring 330. The axial force then clamps the traction planets 332 between the input traction ring 330, the output traction ring 336, and the traction sun 333.

Turning to FIGS. 10A-10C now, an input driver 326 can be a generally circular plate 552 with a central bore 554, which is adapted with a spline or other fastening device to engage the sun gear 312. The input driver 326 includes a surface 556 that engages the load cam rollers 327. The surface 556 can be flat or can have load cam ramps, such as the ramps shown on the input traction ring 330 (see FIGS. 4B and 9, for example). In one embodiment, the input driver 326 includes a bearing race 558 that cooperates with the input bearing race 322 and the rollers 324 to provide the functionality of a thrust bearing for supporting axial loads and rolling contact between stationary and rotating components.

Figure 10F:
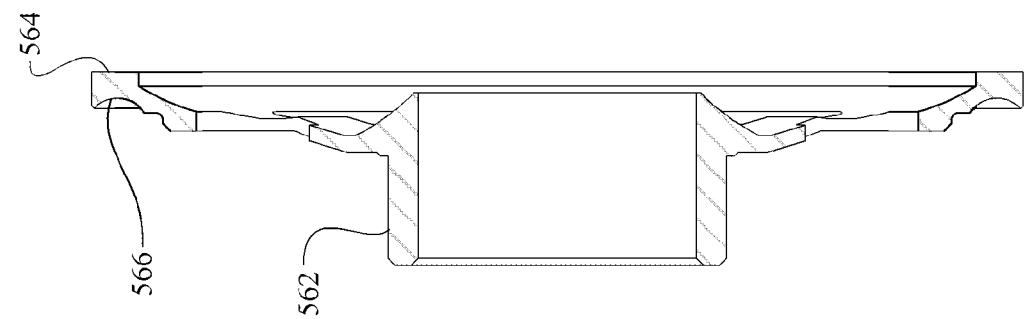
FIG. 10F is a cross-sectional view the output driver of FIG. 10D.
Figure 10D:
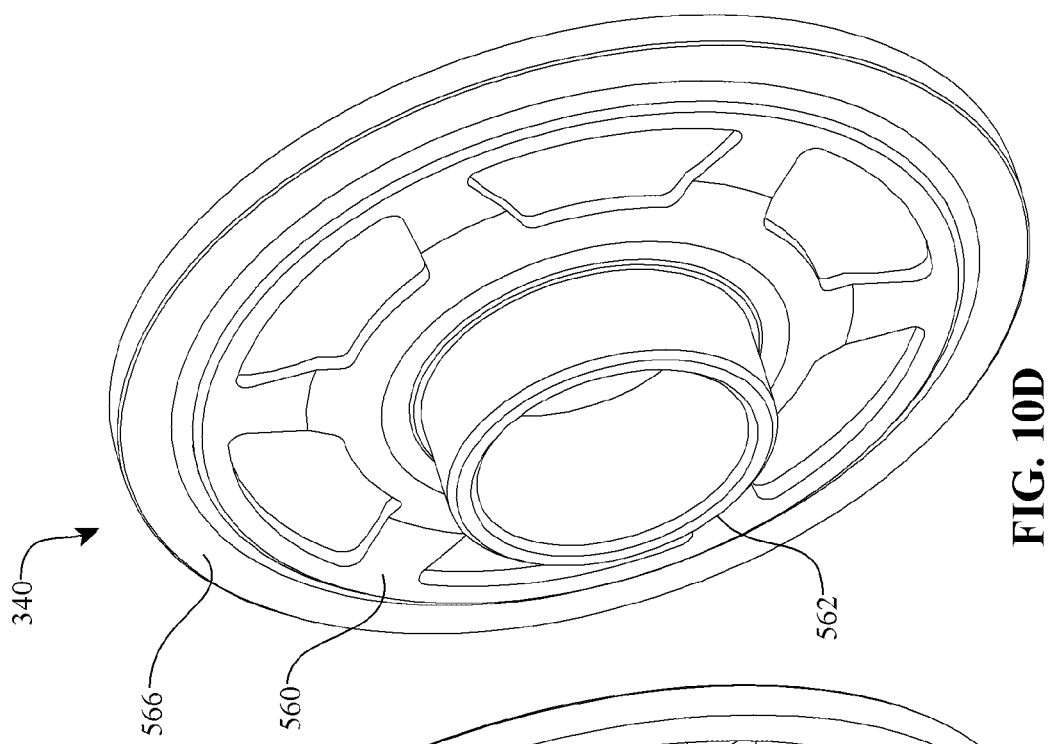
FIG. 10D is a perspective view of an output driver that can be used with the transmission of FIG. 3.
Figure 10E:
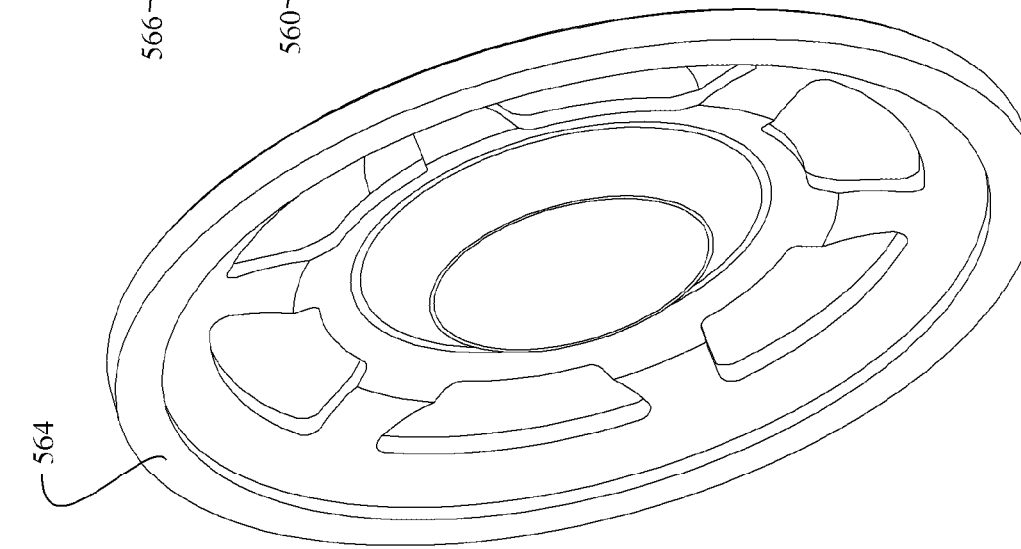
FIG. 10E is another perspective view of an output driver that can be used with the transmission of FIG. 3.
Figure 11B:
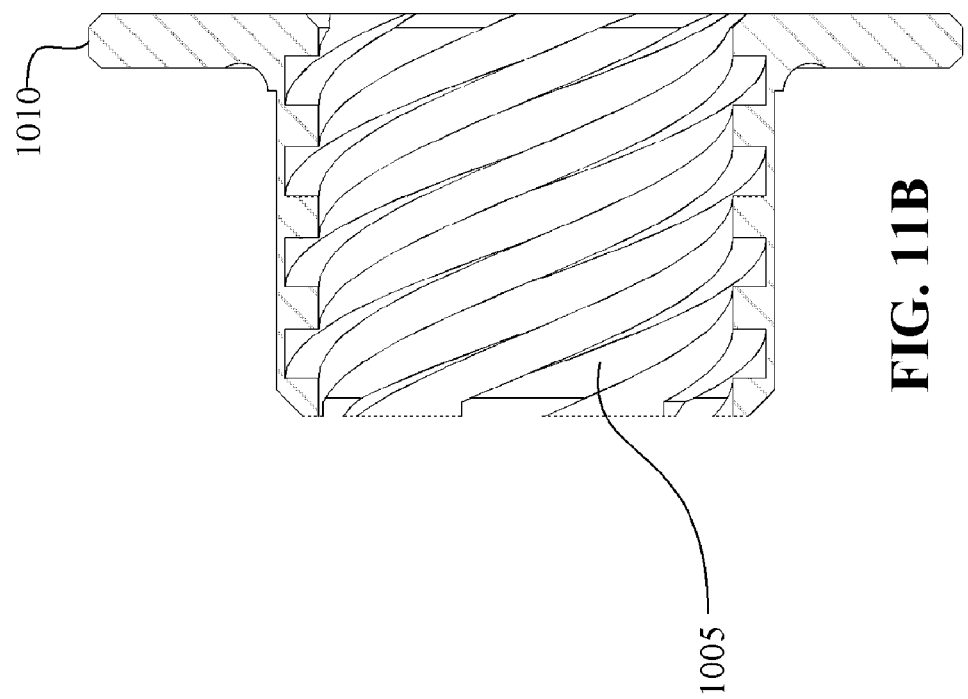
FIG. 11B is a cross-sectional view of the shift screw of FIG. 11A.
Figure 11A:
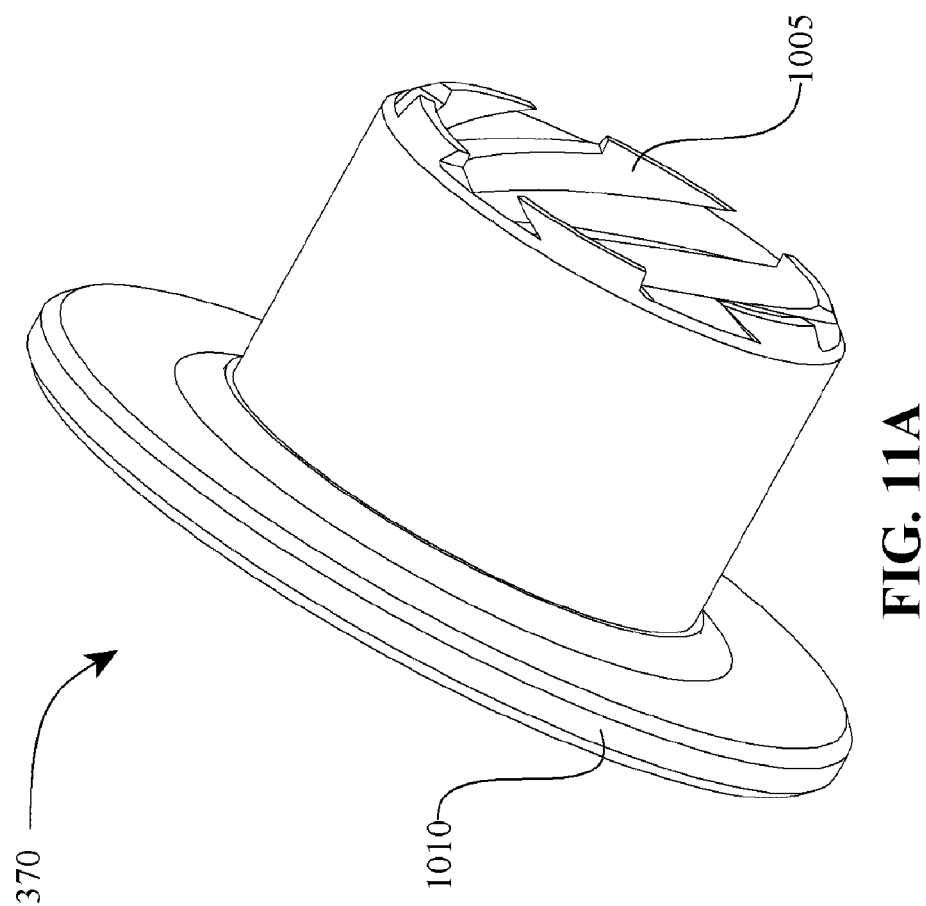
FIG. 11A is a perspective view of a shift screw that can be used with a shifting actuator of the transmission of FIG. 3.
Figure 12B:
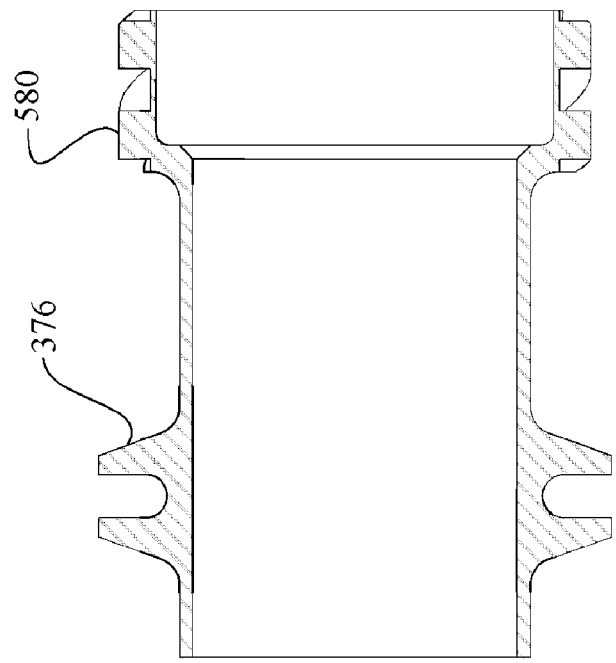
FIG. 12B is a cross-sectional view of the shift pin hub of FIG. 12A.
Figure 12A:
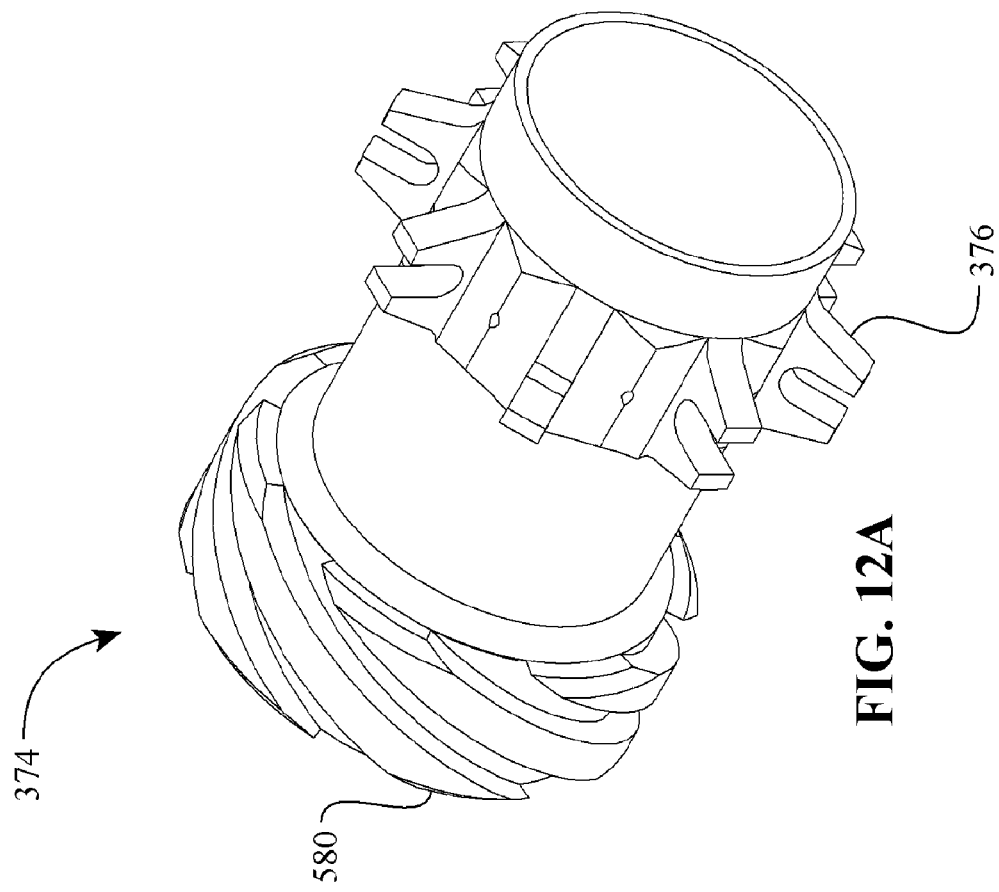
FIG. 12A is a perspective view of a shift pin hub that can be used with a shifting actuator of the transmission of FIG. 3.
Figure 13A:
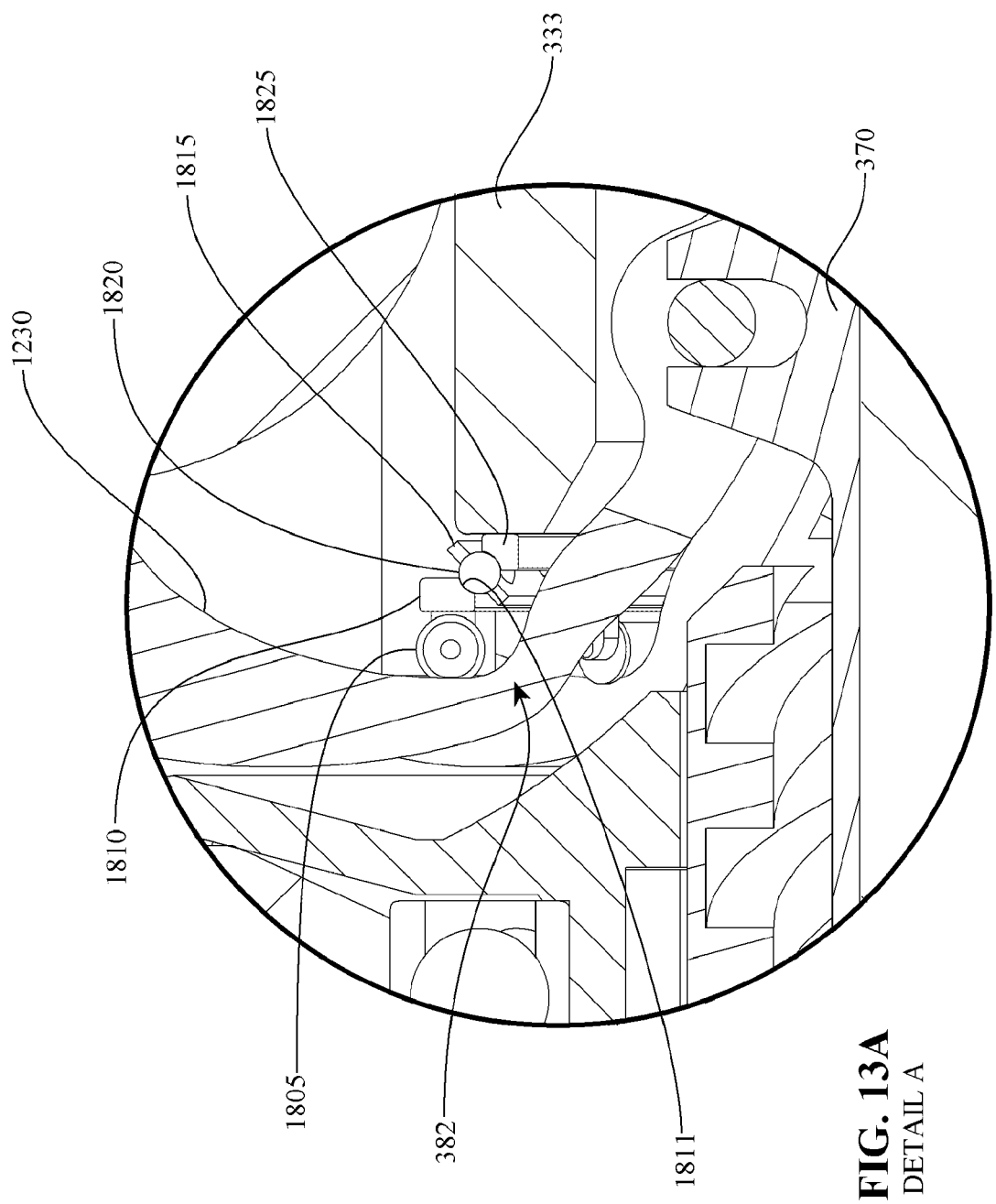
FIG. 13A is a detail view A of FIG. 4B showing a traction sun actuation device that can be used with the transmission of FIG. 3.
Figure 13B:
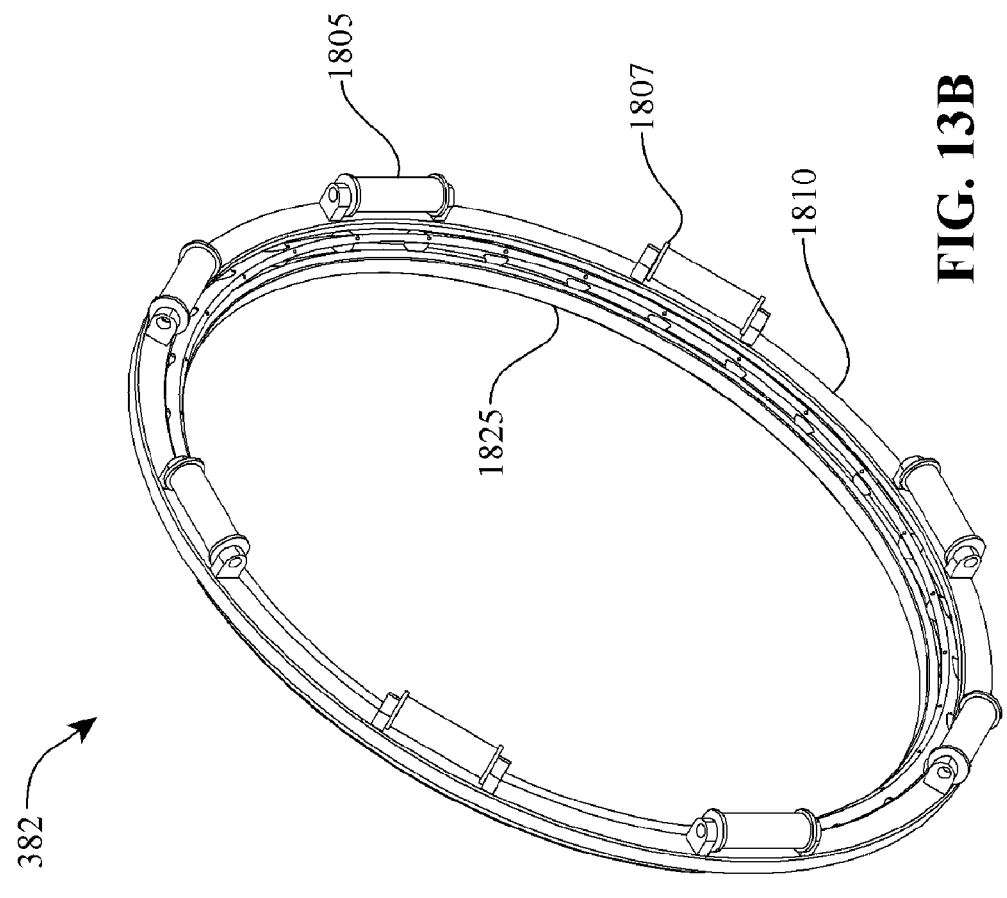
FIG. 13B is a perspective view of the traction sun actuation device of FIG. 13A.
Figure 13C:
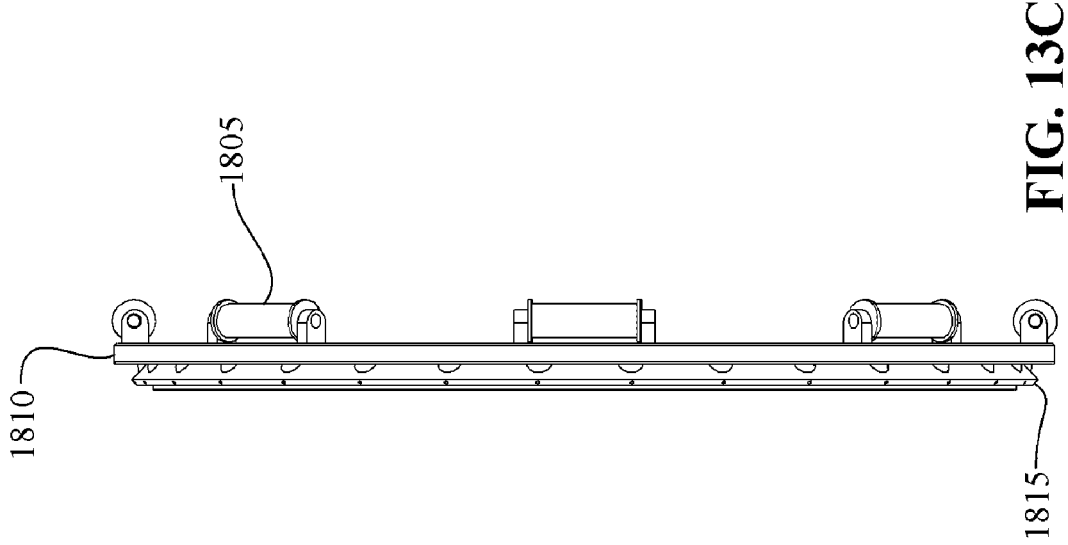
FIG. 13C is a side elevational view of traction sun actuation device of FIG. 13B.
Figure 13D:
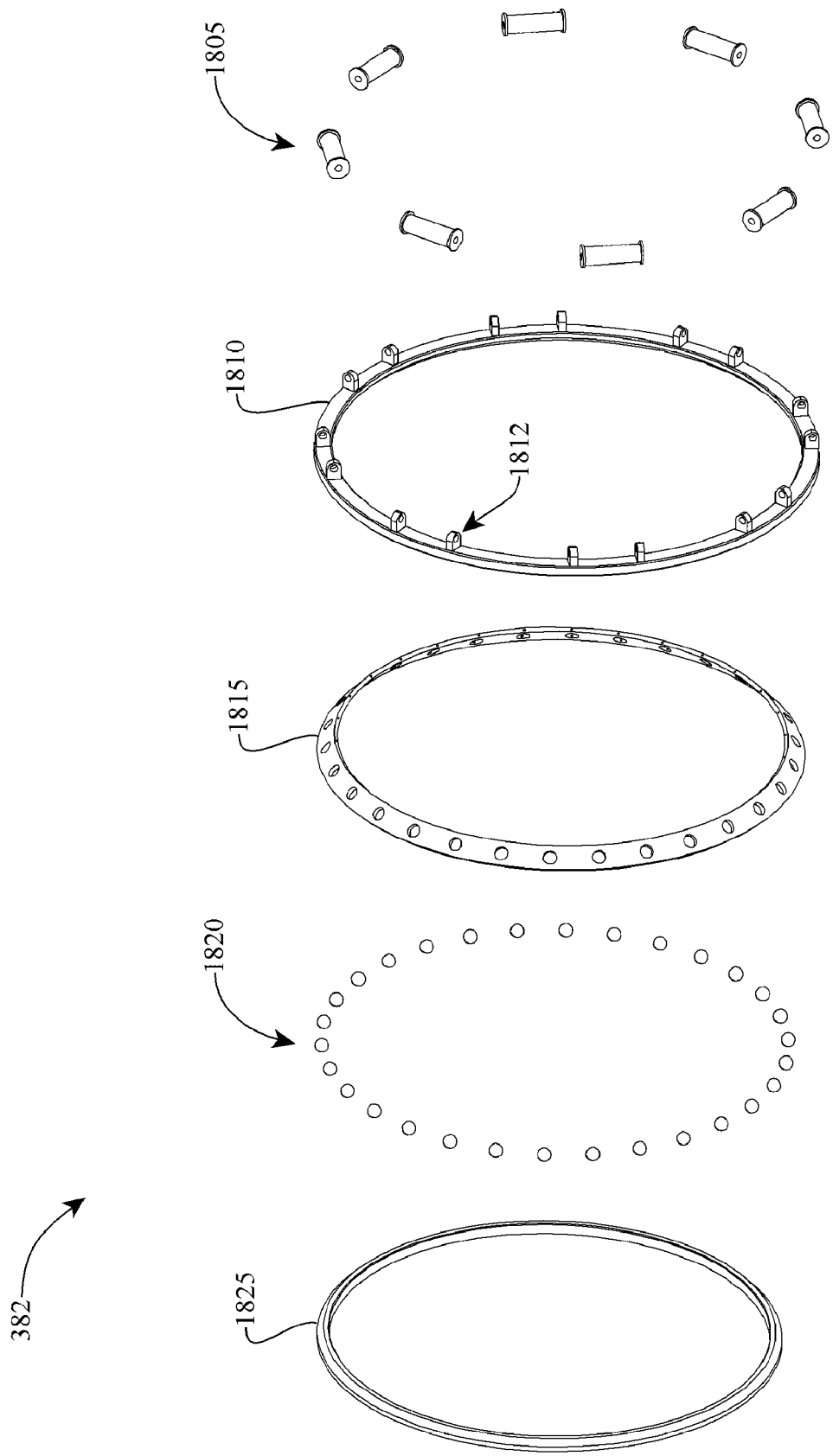
FIG. 13D is an exploded view of the traction sun actuation device of FIG. 13B.

Referencing FIGS. 10D-10F now, an output driver 340 can be a generally circular plate 560 having a central bore with a flange 562, which is adapted to receive bearings 395 and to engage with, for example, a sprocket 348. In another embodiment, the flange 562 can be adapted to receive a bearing 391 that locates and supports the output end cap 346. The output driver 340 includes a surface 564 that is configured to engage the load cam rollers 337. The surface 546 can be flat or can have load ramps, such as the ramps shown (but not referenced) on the output traction ring 336. In one embodiment, the output driver 340 includes a bearing race 566 that cooperates with the output bearing race 344 and the rollers 342 to provide the functionality of a thrust bearing, as discussed above with reference to the input driver 326. The bearing race 566 is located on a side of the output driver 326 that is opposite to the side having the surface 564.

Referencing FIGS. 11A-12B now, the speed ratio of the transmission 300 can be adjusted using the shift screw 370 and the shift pin hub 374. In one embodiment, a shift wheel 375 can be used to drive the shift screw 370. The shift wheel 375 can be, for example, a pulley or a compound gear adapted to be actuated by a linear actuator such as a cable or a chain (not shown). The housing 345 can be suitably adapted to allow the linear actuator to access the shift wheel 375.

The shift pin hub 374 is coupled to the pivot arms 380 by shift pins (not shown) that fit in the fingers 376 and in the shift pin hole 1212 of the pivot arms 380 (see FIGS. 8A-8B). The fingers 376 are configured to fit in the slot 1280 of the pivot arms 380. The shift pin hub 374 is provided with a threaded end 580, in one embodiment, to allow the shift screw 370 to actuate the shift pin hub 374 via corresponding shift screw threads 1005 of the shift screw 370.

The shift screw 370 can mount coaxially with and is rotatable about the central shaft 360. In one embodiment, the shift screw 370 can be axially constrained by the sun gear 312 and the ring gear 316. Suitable thrust bearings can be positioned between the shift screw 370 and, respectively, the sun gear 312 and the ring gear 316 (see FIG. 4B, for example). In one embodiment, the shift screw 370 includes a shift screw flange 1010 adapted to couple to the shift wheel 375.

To adjust the speed ratio of the transmission 300, a shift input is provided by the linear actuator (chain, cable, etc.) to the shift wheel 375, which rotates the shift screw 370. The shift screw threads 1005 engage the shift pin hub threads 580, and since the shift screw 370 is constrained axially at the same time that the shift pin hub 374 is constrained rotationally, the shift screw 370 causes the shift pin hub 374 to move axially. The axial translation of the shift pin hub 374 causes the pivot arms 380 to pivot on the pivot pins (not shown) coupling the shift pin hub fingers 376 and the pivot arms 380. The pivot arms 380 pivot about the centers of the planets 332. Because the pivot arms 380 are coupled to the traction planet axles 334, the pivoting of the pivot arms 380 causes the traction planet axles 334 to tilt radially inward or outward, which results in a change in the relative point of contact between the traction planets 332 and, respectively, the input traction ring 330 and the output traction ring 336. This change the relative point of contact between the traction planets 332 and the traction rings 330, 336 results in a change in the speed ratio of the transmission 300.

In some embodiments, it is preferable that the traction sun 333 translate axially as the pivot arms 380 tilt the traction planet axles 334. Translation of the traction sun 333 can be accomplished by a traction sun actuation device 382, which in one embodiment is positioned between the traction sun 333 and the pivot arms 380. In one embodiment, the traction sun actuation device 382 includes cam rollers 1805 adapted to engage the cam surface 1230 of the pivot arms 380. The cam rollers 1805 can be supported and positioned on cam roller support ring 1810 having support extensions 1812. To react and transfer axial forces, an angular contact thrust bearing is positioned between the support ring 1810 and the traction sun 333. In the embodiment illustrated in FIGS. 13A-13D, a bearing race 1811 is integral with the support ring 1810, a bearing race 1825 is suitably coupled or affixed to the traction sun 333, and a set of bearing rollers 1820 is supported and positioned by a bearing roller retainer 1815. In some embodiments, a traction sun actuation device 382 can be provided for each of end of the traction sun 333, as illustrated in FIGS. 4A-4D.

As the pivot arms 380 pivot about the planets 332, the cam surface 1230 of the pivot arms 380 acts on the cam rollers 1805, which transfer an axial force to the cam roller support ring 1810. The cam rollers 1805 are provided with flanges 1807 to engage the pivot arms 380, and thereby the support ring 1810 is constrained from rotation about the central shaft 360. The support ring 1810 then transfers the axial force to the traction sun 333 via the bearing race 1810, bearing rollers 1820, and bearing race 1825. As will be discussed further below, the curvature or profile of the cam surface 1230 determines the relative speed between the speed of axial translation of the traction sun 333 vis-à-vis the speed of change of the tilt of the traction planet axles 334.

The profile of the shift cam surface 1230 usually varies according to the location of the contact point between the traction sun 333 and the traction planets 332, as well as the desired amount of relative axial motion between the traction planets 332 and the traction sun 333. The profile of the cam surface 1230 can be such that axial translation of the traction sun 333 relative to the traction planets 332 is proportional to the change of the tilt of the traction planets axles 334. The angle of tilt of the traction planet axles 334 is referred to herein as "gamma." The applicant has discovered that controlling the axial translation of the traction sun 333 relative to the change in gamma influences CVT ratio control forces. For example, if the axial translation of the traction sun 333 is linearly proportional to a change in gamma, the normal force at the cam surface 1230 and the cam roller 1805 is generally parallel to the traction planet axles 334. This enables an efficient transfer of a shift moment about the traction planets 332 to horizontal shift forces that translate the traction sun 333.

A linear relation between translation of the traction sun 333 and gamma change is given as translation of the traction sun 333 is the mathematical product of the radius of the planets 332, the gamma angle and RSF (that is, translation of traction sun 333=ball radius*gamma angle*RSF), where RSF is a roll-slide factor. RSF describes the transverse creep rate between the traction planets 332 and the traction sun 333. As used here, "creep" is the discrete local motion of a body relative to another. In traction drives, the transfer of power from a driving element to a driven element via a traction interface requires creep. Usually, creep in the direction of power transfer is referred to as "creep in the rolling direction." Sometimes the driving and driven elements experience creep in a direction orthogonal to the power transfer direction, in such a case this component of creep is referred to as "transverse creep." During operation, the traction planet 332 and the traction sun 333 on each other. When the traction sun 333 is translated axially (that is, orthogonal to the rolling direction), transverse creep is imposed between the traction sun 333 and the traction planets 332. An RSF equal to 1.0 indicates pure rolling. At RSF values less than 1.0, the traction sun 333 translates slower than the traction planet 332 rotates. At RSF values greater than 1.0, the traction sun 333 translates faster than the traction planet 332 rotates.

A process for defining a profile for the cam surface 1230 for any variation of transverse creep and/or location of the interface between the traction sun 333 and the pivot arm 380 and cam roller 1805. This process generates different cam profiles and aids in determining the effects on shift forces and shifter displacement. In one embodiment, the process involves the use of parametric equations to define a two-dimensional datum curve that has the desired profile for the cam surface 1230. The curve is then used to generate models of the cam surface 1230. In one embodiment of the process, the parametric equations of the datum curve are as follows:

$$\text{theta}=2*GAMMA\_MAX*t-GAMMA\_MAX$$

$$x=LEG*\sin(\text{theta})-0.5*BALL\_DIA*RSF*\text{theta}*pi/180+0.5*ARM*\cos(\text{theta})$$

$$y=LEG*\cos(\text{theta})-0.5*ARM*\sin(\text{theta})$$

$$z=0$$

The angle theta varies from minimum gamma (which in some embodiments is −20 degrees) to maximum gamma (which in some embodiments is +20 degrees). GAMMA_MAX is the maximum gamma. The parametric range variable "t" varies from 0 to 1. Here "x" and "y" are the center point of the cam rollers 1805 on each side of the traction sun 333. The equations for x and y are parametric. "LEG" and "ARM" define the position of the interface between the pivot arm 380, cam roller 1805, and traction sun 333. More specifically, LEG is the perpendicular distance between the longitudinal axis of the traction planet axle 334 to a line that passes through the centers of the two corresponding cam rollers 1805. ARM is the distance between centers of the cam rollers 1805 on either side of the traction sun 333.

RSF values above zero are preferred. Applicant discovered that an RSF of zero dramatically increases the force required to shift the CVT. Usually, RSF values above 1.0 and less than 2.5 are preferred. There is a maximum RSF for a maximum gamma angle. For example, for gamma equals to +20 degrees an RSF of about 1.6 is the maximum. RSF further depends on the size of the traction planet 332 and the size of the traction sun 333, as well as the location of the cam roller 1805.

Linear axial translation of the traction sun 333 relative to gamma is not the only desired relation. Hence, for example, if it is desired that the translation of the traction sun 333 be linearly proportional to CVT ratio, then the RSF factor is made a function of gamma angle or CVT ratio so that the relation between the position of the traction sun 333 and CVT ratio is linearly proportional. This is a desirable feature for some types of control schemes.

It should be noted that while several embodiments have been described above that implement a continuously variable variator in conjunction with a planetary gear set for a bicycle transmission, in other embodiments the planetary gear set is not used. Rather, the crankshaft can be directly, or through a load cam assembly, coupled to the input driver 326 or the input traction ring 330 of the variator.

Figures 14A, 14B, 14C:
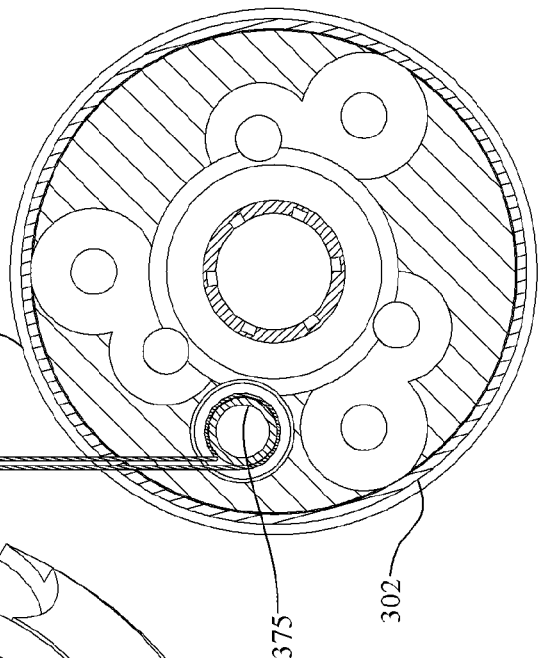
FIG. 14A is a perspective view of certain components of the CVT of FIG. 3 showing a shifting actuator for the CVT.
FIG. 14B is second perspective view of certain components shown in FIG. 14A.
FIG. 14C is a cross-sectional view of the components shown in FIG. 14A.

Turning to FIGS. 14A-14C now, a shift actuator 1 can be provided to actuate the shift wheel 375. As shown, the end cap 302 and/or the planetary gearset carrier 320 can be adapted to allow the shift actuator 1 to engage the shift wheel 375. The end cap 302 can have, for example, holes 2 that allow the shift actuator 1 to enter and exit the housing 345. In one embodiment, the carrier 320 supports the shift wheel 375 (on an axle or pin that is not shown) and, hence, the carrier 320 can be provided with holes 3 that allow the shift actuator 1 to pass into and out of the carrier 320 to access the shift wheel 375. The shift actuator 1 can be, for example, a shift cable, wire, belt, etc. If the shift wheel 375 is a gear with teeth, the shift actuator 1 can be a chain, for example. It will be obvious to a person of ordinary skill in the relevant technology that other shift actuators can be used to control the shift wheel 375.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

The invention claimed is:

1. A bicycle comprising:
   a plurality of bicycle frame members configured to form a support structure;
   a crankshaft operationally coupled to one or more cranks of the bicycle, the crankshaft configured to be supported with the plurality of bicycle frame members; and
   a continuously variable transmission (CVT) coaxially coupled with, and coaxially mounted about, the crankshaft, the CVT comprising:
      a plurality of spherical traction planets;
      a pivot arm coupled to each traction planet;
      a traction sun coupled to each traction planet, the traction sun located radially inward of the traction planets;
      an input ring in contact with each of the spherical traction planets, the input ring located radially outward of the traction sun;
      an output ring in contact with each of the spherical traction planets, the output ring located radially outward of the traction sun, wherein each spherical traction planet is placed between the input ring and the output ring; and
      a cage coupled to each of the spherical traction planets, the cage located in between the input and output rings and is operationally connected to a hub shell by splines.

2. The bicycle of claim 1, wherein a housing of the CVT is incorporated with the bicycle frame members.

3. The bicycle of claim 1, wherein a housing of the CVT incorporates a carrier of a planetary gear set.

4. The bicycle of claim 1, further comprising a planetary gear set.

5. The bicycle of claim 4, wherein the carrier of the planetary gear set is incorporated with the housing of the CVT.

6. The bicycle of claim 4, wherein the crankshaft is configured to drive a ring gear of the planetary gear set.

7. The bicycle of claim 6, wherein the ring gear is configured to drive planetary gears of the planetary gear set.

8. The bicycle of claim 7, wherein the planetary gears are configured to drive a sun gear of the planetary gear set.

9. The bicycle of claim 8, wherein the sun gear is configured to drive an input driver of the CVT.

10. The bicycle of claim 9, wherein the input driver is operably coupled to a traction ring of the CVT.

11. The bicycle of claim 1, further comprising a pivot pin hub coupled to the pivot arms.

12. The bicycle of claim 11, wherein an axial movement of the pivot pin hub causes a pivoting of the pivot arms.

13. The bicycle of claim 1, further comprising an axle coupled to each of the spherical traction planets, wherein the axle couples to the pivot arm.

* * * * *